(12) United States Patent
Lu et al.

(10) Patent No.: US 12,339,537 B2
(45) Date of Patent: Jun. 24, 2025

(54) LIQUID CRYSTAL GRATING AND STEREOSCOPIC DISPLAY DEVICE

(71) Applicant: Shanghai Tianma Microelectronics Co., Ltd., Shanghai (CN)

(72) Inventors: Feng Lu, Shanghai (CN); Yang Zeng, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 10 days.

(21) Appl. No.: 18/369,902

(22) Filed: Sep. 19, 2023

(65) Prior Publication Data

US 2024/0004233 A1   Jan. 4, 2024

(30) Foreign Application Priority Data

Mar. 31, 2023   (CN) .......................... 202310341673.2

(51) Int. Cl.
*G02F 1/1335*   (2006.01)
*G02F 1/1337*   (2006.01)
*G02F 1/135*   (2006.01)

(52) U.S. Cl.
CPC .. *G02F 1/133504* (2013.01); *G02F 1/133707* (2013.01); *G02F 1/133769* (2021.01); *G02F 1/1357* (2021.01); *G02F 2201/30* (2013.01)

(58) Field of Classification Search
CPC ......... G02F 1/133504; G02F 1/133769; G02F 1/1357; G02F 1/133707; G02F 2201/30
See application file for complete search history.

(56) References Cited

U.S. PATENT DOCUMENTS

| | | | | |
|---|---|---|---|---|
| 6,313,818 | B1 * | 11/2001 | Kondo | ................. G09G 3/3648 |
| | | | | 345/96 |
| 2015/0293409 | A1 * | 10/2015 | Usukura | ............... G02F 1/1337 |
| | | | | 349/123 |
| 2020/0272023 | A1 * | 8/2020 | Won | ........................ G03H 1/02 |
| 2022/0252931 | A1 * | 8/2022 | Jamali | ............... G02F 1/134309 |

* cited by examiner

*Primary Examiner* — Michael H Caley
*Assistant Examiner* — David Y Chung
(74) *Attorney, Agent, or Firm* — KDW Firm PLLC

(57) ABSTRACT

Provided are a liquid crystal grating and a stereoscopic display device. The liquid crystal grating includes at least one liquid crystal cell. A liquid crystal cell includes a first substrate, first electrodes, a first alignment layer, a liquid crystal layer and a second substrate which are disposed sequentially. In a first state, the liquid crystal cell includes multiple first grating units which are arranged along a first direction, and a first grating unit includes multiple first electrodes which are disposed at intervals from each other along the first direction. Along the first direction, a first electric field is formed between two closest first electrodes which are located in two adjacent first grating units, respectively, and in the liquid crystal cell, an alignment direction of the first alignment layer is the same as an electric field direction of the first electric field.

28 Claims, 15 Drawing Sheets

LIQUID CRYSTAL GRATING AND STEREOSCOPIC DISPLAY DEVICE

CROSS-REFERENCE TO RELATED APPLICATION(S)

This application claims priority to Chinese Patent Application No. 202310341673.2 filed Mar. 31, 2023, the disclosure of which is incorporated herein by reference in its entirety.

TECHNICAL FIELD

The present disclosure relates to the field of display technologies and, in particular, to a liquid crystal grating and a stereoscopic display device.

BACKGROUND

Since the two-dimensional display is difficult to clearly express three-dimensional depth information accurately, people have been continuously investigating a display technology that can display stereoscopic scenes, that is, the three-dimensional image display technology. The holographic three-dimensional display technology utilizes the diffraction or interference of light to record the amplitude and phase information of object light, and then reconstructs the information of the object light through the diffraction of light. The holographic three-dimensional display technology is the only real three-dimensional display technology among various display methods.

When displaying a three-dimensional image, the stereoscopic display device forms a left-eye image and a right-eye image through the diffraction function of a liquid crystal grating after a spatial light modulator (SLM) performs phase modulation and amplitude modulation on optical signals. How to improve the display effect has become an urgent problem to be solved.

SUMMARY

The present disclosure provides a liquid crystal grating and a stereoscopic display device so that the adverse impact of a transverse electric field on the rotation of liquid crystal molecules is reduced and the problem of antiphase domains is alleviated.

In a first aspect, an embodiment of the present disclosure provides a liquid crystal grating. The liquid crystal grating includes at least one liquid crystal cell. A liquid crystal cell includes a first substrate, first electrodes, a first alignment layer, a liquid crystal layer and a second substrate which are disposed sequentially. In a first state, the liquid crystal cell includes multiple first grating units which are arranged along a first direction, and a first grating unit includes multiple first electrodes which are disposed at intervals from each other along the first direction.

Along the first direction, a first electric field is formed between two closest first electrodes which are located in two adjacent first grating units, respectively, and in the liquid crystal cell, an alignment direction of the first alignment layer is the same as an electric field direction of the first electric field.

In a second aspect, an embodiment of the present disclosure provides a stereoscopic display device. The stereoscopic display device includes a light source, a spatial light modulator and a gating component which are disposed sequentially.

The gating component includes at least one liquid crystal grating according to the first aspect.

According to the liquid crystal grating provided in the embodiment of the present disclosure, the electric field direction of the first electric field is the same as the alignment direction of the first alignment layer. Therefore, the electric field direction affecting liquid crystal molecules close to the first alignment layer is towards the alignment direction of the first alignment layer, and will not be towards the direction opposite to the alignment direction of the first alignment layer; the liquid crystal molecules close the first alignment layer will not flip to an opposite direction, so that the adverse impact of the transverse electric field on the rotation of the liquid crystal molecules is reduced and the problem of antiphase domains is alleviated.

DETAILED DESCRIPTION

Figure 1:
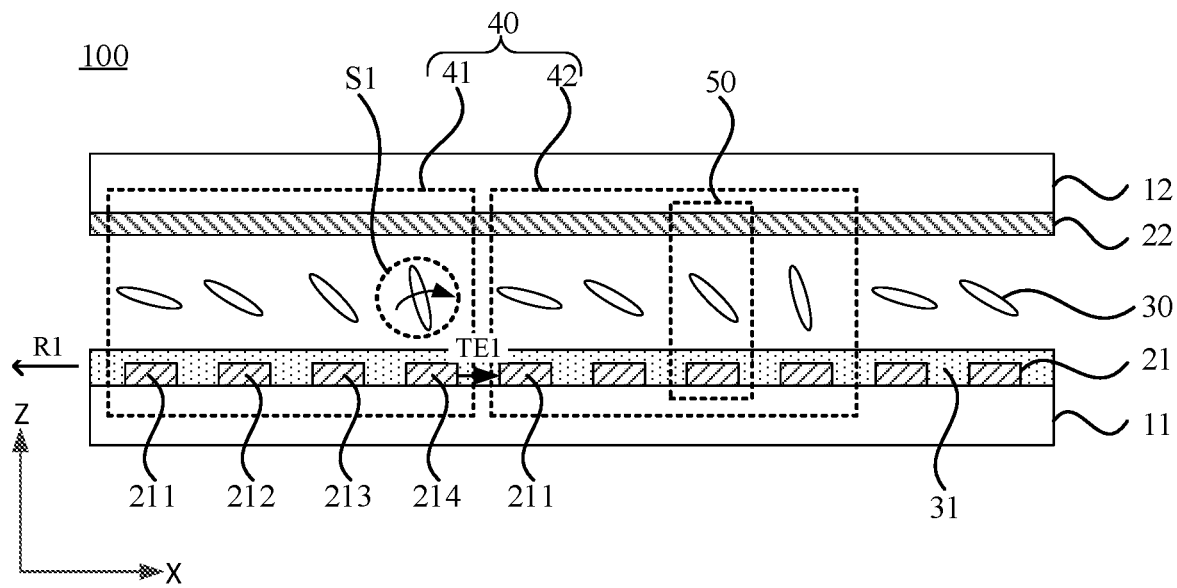
FIG. 1 is a sectional view of a liquid crystal grating in the research process.

Hereinafter the present disclosure will be further described in detail in conjunction with the drawings and embodiments. It is to be understood that the specific embodiments set forth below are intended to illustrate and not to limit the present disclosure. Additionally, it is to be noted that for ease of description, only part, not all, of structures related to the present disclosure are illustrated in the drawings.

FIG. 1 is a sectional view of a liquid crystal grating in the research process. Referring to FIG. 1, a liquid crystal grating includes a first substrate 11, a second substrate 12 and a liquid crystal layer 30. The liquid crystal layer 30 is located between the first substrate 11 and the second substrate 12. The liquid crystal layer 30 includes liquid crystal molecules. The liquid crystal grating includes multiple grating units 40. The grating units 40 are arranged along a first direction X, and a grating unit 40 includes multiple first electrodes 21 and a first second electrode 22. The first electrodes 21 are located between the first substrate 11 and the liquid crystal layer 30. The first electrodes 21 are disposed at intervals from each other, and the first electrodes 21 are disposed along the first direction X. Along the first direction X, a certain distance exists between two adjacent first electrodes 21. The grating units 40 share the same one second electrode 22, and the second electrode 22 is a whole-surface electrode.

Figure 2:
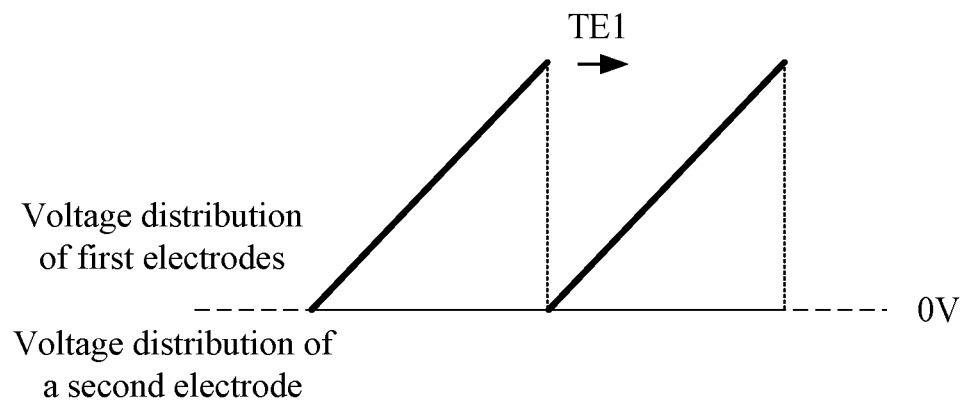
FIG. 2 is a diagram showing the voltage distribution of first electrodes and the voltage distribution of a second electrode of a liquid crystal grating in the research process.

FIG. 2 is a diagram showing the voltage distribution of a first electrode and the voltage distribution of a second electrode of a liquid crystal grating in the research process. Referring to FIG. 1 and FIG. 2, according to the related research, it is found that a voltage difference exists between a first electrode 21 and the second electrode 22 during stereoscopic display. A longitudinal electric field formed by the first electrode and the second electrode can drive liquid crystal molecules to rotate. At least two first electrodes 21 have different voltages, and then longitudinal electric fields of different intensities which are arranged along the first direction X are formed. The longitudinal electric fields of different intensities cause liquid crystal molecules to rotate by different angles, forming a refractive index gradient, and multiple grating units 40 which are arranged along the first direction X are formed. Therefore, a grating unit 40 may also include liquid crystal molecules. However, a transverse electric field is formed between first electrodes 21 of different voltages. The transverse electric field will lead to a flexoelectric effect of liquid crystal molecules, changing the rotation behavior of the liquid crystal molecules. As a result, the liquid crystal molecules in the liquid crystal grating cannot flip in conformity to the ideal situation while rotating towards the direction opposite to a pre-tilt angle, leading to the problem of antiphase domains.

Referring to FIG. 1 and FIG. 2, according to the related research, it is found that some regions in the liquid crystal grating are in an undesirable state. It is further found that along the first direction X, a first electric field TE1 is formed between two closest first electrodes 21 which are located in two adjacent grating units 40 respectively. The first electric field TE1 is a transverse electric field. The liquid crystal grating includes a first alignment layer 31. The first alignment layer 31 is located between the first electrodes 21 and the liquid crystal layer 30. In some regions of the liquid crystal grating, an alignment direction R1 of the first alignment layer 31 is opposite to an electric field direction of the first electric field TE1. Under the combined impact of the first electric field TE1 and the longitudinal electric field, a liquid crystal molecule in region S1 rotates along the direction of the arrow in FIG. 1 and flips to an opposite direction, resulting in a bubble-like antiphase domain in region S1. The liquid crystal molecule in region S1 is close to the first electrode 21. The first alignment layer 31 may be in direct contact with the first electrodes 21. In other implementations, a protective layer may further be disposed between the first alignment layer 31 and the first electrodes 21. The first alignment layer 31 is located on a side of the protective layer away from the first electrodes 21. The protective layer provides a flat surface for the first alignment layer 31 to improve the flatness of the first alignment layer 31.

Figure 3:
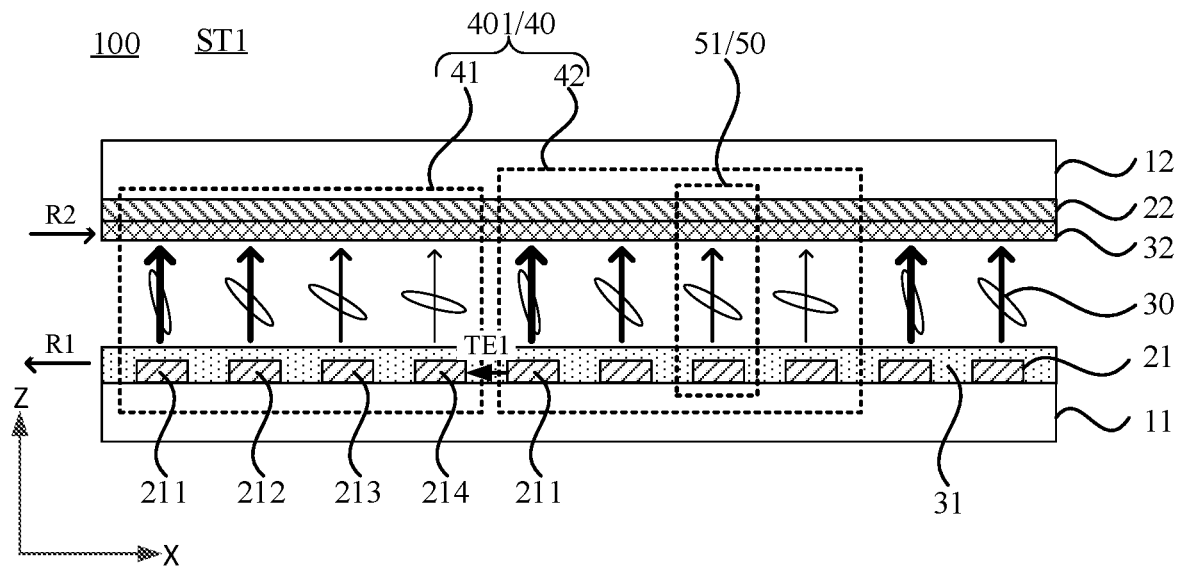
FIG. 3 is a sectional view of a liquid crystal grating according to an embodiment of the present disclosure.
Figure 4:
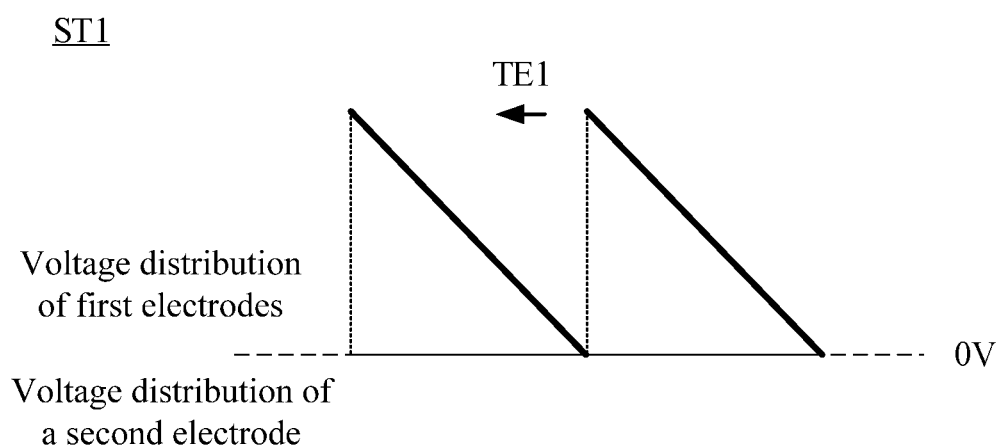
FIG. 4 is a diagram showing the voltage distribution of first electrodes and the voltage distribution of a second electrode of a liquid crystal grating according to an embodiment of the present disclosure.

FIG. 3 is a sectional view of a liquid crystal grating according to an embodiment of the present disclosure, and FIG. 4 is a diagram showing the voltage distribution of first electrodes and the voltage distribution of a second electrode of a liquid crystal grating according to an embodiment of the present disclosure. Referring to FIG. 3 and FIG. 4, the liquid crystal grating includes at least one liquid crystal cell 100. A liquid crystal cell 100 includes a first substrate 11, first electrodes 21, a first alignment layer 31, a liquid crystal layer 30 and a second substrate 12 which are disposed sequentially. In a first state ST1, the liquid crystal cell 100 includes multiple first grating units 401 which are arranged along the first direction X. A first grating unit 401 includes multiple first electrodes 21 which are disposed at intervals along the first direction X. Along the first direction X, a certain distance exists between two adjacent first electrodes 21. Along the first direction X, a first electric field TE1 is formed between two closest first electrodes 21 which are located in two adjacent first grating units 401 respectively. In the liquid crystal cell 100, an alignment direction R1 of the first alignment layer 31 is the same as an electric field direction of the first electric field TE1.

According to the liquid crystal grating provided in the embodiment of the present disclosure, the electric field direction of the first electric field TE1 is the same as the alignment direction R1 of the first alignment layer 31. Therefore, the electric field direction affecting liquid crystal molecules close to the first alignment layer 31 is towards the alignment direction R1 of the first alignment layer 31, and will not be towards the direction opposite to the alignment direction of the first alignment layer 31; the liquid crystal molecules close to the first alignment layer 31 will not flip to an opposite direction, so that the adverse impact of the transverse electric field on the rotation of the liquid crystal molecules is reduced and the problem of antiphase domains is alleviated.

Exemplarily, referring to FIG. 3 and FIG. 4, the liquid crystal cell 100 further includes a second electrode 22. The second electrode 22 is located between the second substrate 12 and the liquid crystal layer 30. During stereoscopic display, a voltage difference exists between a first electrode 21 and the second electrode 22. A longitudinal electric field formed between the first electrode 21 and the second electrode 22 can drive liquid crystal molecules to rotate, and multiple first grating units 401 are formed. The first grating units 401 are arranged repeatedly along the first direction X. The liquid crystal gating is used for light diffraction and deflection. When stereoscopic display is not performed, no first grating unit 401 is formed, and the liquid crystal grating is not configured for or assists in light diffraction and deflection. The direction of the longitudinal electric field may be a third direction Z or the opposite direction of the third direction Z.

Optionally, referring to FIG. 3, the same first grating unit 401 includes multiple first electrode groups 51 which are arranged along the first direction X. A first electrode group 51 includes at least one first electrode 21 and at least one second electrode 22. In the same first electrode group 51, a first electrode 21 at least partially overlaps a second electrode 22; that is, a first electrode 21 overlaps a second electrode 22, or a first electrode 21 partially overlaps a second electrode 22. The voltage difference between the first electrode 21 and the second electrode 22 is a first voltage difference. The longitudinal electric field formed by the first voltage difference can drive liquid crystal molecules to rotate. The first voltage difference is a difference between a voltage of a first electrode 21 and a voltage of a second electrode 22 in the first grating unit 401, that is, the first voltage difference is a voltage of a first electrode 21 minus a voltage of the second electrode 22.

Exemplarily, referring to FIG. 3, a first electrode group 51 includes a first electrode 21 and a second electrode 22. The first voltage difference exists between voltages of a first electrode 21 and a second electrode 22 in the same first electrode group 501. In other implementations, a first electrode group 51 includes multiple first electrodes 21 and a second electrode 22.

Optionally, referring to FIG. 3 and FIG. 4, various first voltage differences have the same polarity. Longitudinal electric fields (longitudinal electric fields illustrated by arrows in FIG. 3) formed by first electrodes 21 and the second electrode 22 have the same electric field direction. The longitudinal electric fields formed by the first electrodes 21 and the second electrodes 22 drives liquid crystal molecules to rotate towards the same direction.

Exemplarily, referring to FIG. 3 and FIG. 4, multiple first electrodes 21 includes first sub-first electrodes 211, second sub-first electrodes 212, third sub-first electrodes 213 and fourth sub-first electrodes 214. A voltage of a first sub-first electrode 211 is greater than the voltage of the second electrode 22, and a positive first voltage difference is formed between the first sub-first electrode 211 and the second electrode 22. A voltage of a second sub-first electrode 212 is greater than the voltage of the second electrode 22, and a positive first voltage difference is formed between the second sub-first electrode 212 and the second electrode 22. A voltage of a third sub-first electrode 213 is greater than the voltage of the second electrode 22, and a positive first voltage difference is formed between the third sub-first electrode 213 and the second electrode 22. A voltage of a fourth sub-first electrode 214 is greater than the voltage of the second electrode 22, and a positive first voltage difference is formed between the fourth sub-first electrode 214 and the second electrode 22. Arrows in FIG. 3 represent longitudinal electric fields, and the thickness of the arrows indicates the intensity of the longitudinal electric fields. The thicker the arrow, the stronger the longitudinal electric field, the larger the first voltage difference.

Optionally, referring to FIG. 3 and FIG. 4, in the same first grating unit 401, along the first direction X, various first voltage differences gradually decrease, intensities of longitudinal electric fields formed by various first electrode groups 51 gradually decrease, and rotation angles of liquid crystal molecules gradually decrease. In other implementations, in the same first grating unit 401, along the first direction X, first voltage differences gradually increase, and thus the alignment direction R1 of the first alignment layer 31 is changed accordingly so that the alignment direction R1 is the same as the electric direction of the first electric field TE1. It is to be understood that in the same first grating unit 401, due to the gradual increase or gradual decrease of the first voltage differences along the first direction X, a jump occurs in first voltage differences of two adjacent first grating units 401. Accordingly, refractive indexes formed by liquid crystal molecules gradually change in the same first grating unit 401, and a jump occurs in refractive indexes at the boundary of two adjacent first grating units 401, and thus a grating with the diffraction function is formed.

Exemplarily, referring to FIG. 3 and FIG. 4, a first grating unit 401 includes M (exemplarily, M=4 in FIG. 3) first electrode groups 51, where M is a positive integer larger than 1. In the same first grating unit 401, along the first direction X, first voltage differences corresponding to the first first electrode group 51 to the M-th first electrode group 51 change linearly. In the same first grating unit 401, intensities of longitudinal electric fields formed by various first electrode groups 51 increase or decrease linearly. Since the rotation angle of liquid crystal molecules is in direct proportion to the intensity of the longitudinal electric field, various first voltage differences which change linearly result in refractive indexes of liquid crystal molecules which change linearly, so that the optical path is simplified. In other implementations, the first voltage differences corresponding to the first first electrode group 51 to the M-th first electrode group 51 change in other rules.

Optionally, referring to FIG. 3, multiple first grating units 401 share one second electrode 22. Along a direction perpendicular to a plane where the first substrate 11 is located, the second electrode 22 overlaps first electrodes 21 in multiple first grating units 401. The second electrode 22 may be a whole-surface electrode.

Figure 5:
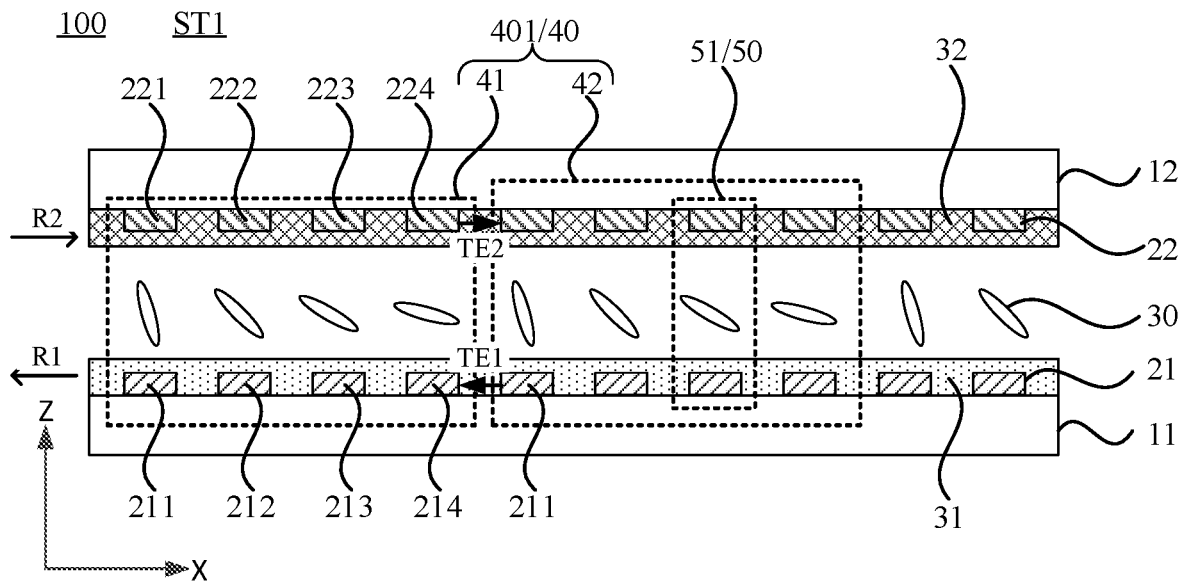
FIG. 5 is a sectional view of another liquid crystal grating according to an embodiment of the present disclosure.
Figure 6:
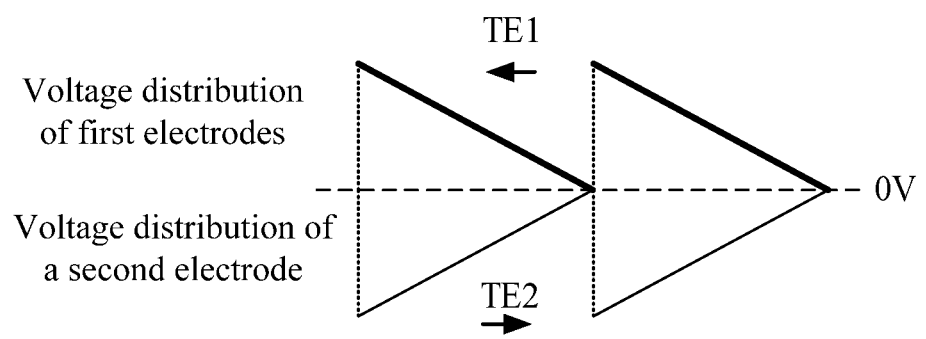
FIG. 6 is a diagram showing the voltage distribution of first electrodes and the voltage distribution of second electrodes of another liquid crystal grating according to an embodiment of the present disclosure.

FIG. 5 is a sectional view of another liquid crystal grating according to an embodiment of the present disclosure, and FIG. 6 is a diagram showing the voltage distribution of first electrodes and the voltage distribution of second electrodes of another liquid crystal grating according to an embodiment of the present disclosure. Referring to FIG. 5 and FIG. 6, the liquid crystal cell 100 further includes a second alignment layer 32. The second alignment layer 32 is located between second electrodes 22 and the liquid crystal layer 30. In the first state ST1, a first grating unit 401 includes multiple second electrodes 22 which are disposed at intervals from each other, and the second electrodes 22 are disposed along the first direction X. Along the first direction X, a certain distance exists between two adjacent second electrodes 22. Along the first direction X, a second electric field TE2 is formed between two closest second electrodes 22 which are located in two adjacent first grating units 401 respectively. The second electric field TE2 is a transverse electric field. In the liquid crystal cell 100, an alignment direction R2 of the second alignment layer 32 is the same as an electric field direction of the second electric field TE2. In the embodiment of the present disclosure, the electric field direction of the second electric field TE2 is the same as the alignment direction R2 of the second alignment layer 32. Therefore, the electric field direction affecting liquid crystal molecules close to the second alignment layer 32 is towards the alignment direction R2 of the second alignment layer 32, and will not be towards the direction opposite to the alignment direction of the second alignment layer 32; the liquid crystal molecules close to the second alignment layer will not flip to an opposite direction, so that the adverse impact of the transverse electric field on the rotation of the liquid crystal molecules is reduced and the problem of antiphase domains is alleviated.

Exemplarily, referring to FIG. 5 and FIG. 6, at least two first electrodes 21 exist and have different voltages, and a transverse electric field is generated between the first electrodes 21. At least two second electrodes 22 exist and have different voltages, and a transverse electric field is generated between the second electrodes 22. In this manner, transverse electric fields are distributed on first electrodes 21 and second electrodes 22, that is, transverse electric fields are distributed on the first substrate 11 and the second substrate 12, rather than concentrated on a single substrate (substrates include the first substrate 11 and the second substrate 12), so that the intensity of the transverse electric field on a single substrate is reduced. Therefore, the adverse impact of the transverse electric field on the rotation of liquid crystal molecules is reduced and the problem of antiphase domains is alleviated.

Exemplarily, referring to FIG. 5 and FIG. 6, in the same first grating unit 401, at least two first electrodes 21 have different voltages, and at least two second electrodes 22 have different voltages. In the same first grating unit 401, transverse electric fields are distributed on the first substrate 11 and the second substrate 12, so that the adverse impact of the transverse electric field on the rotation of liquid crystal molecules is reduced and the problem of antiphase domains is alleviated.

Exemplarily, referring to FIG. 1 and FIG. 2, a voltage of the first sub-first electrode 211 is +1V, a voltage of the second sub-first electrode 212 is +2V, a voltage of the third sub-first electrode 213 is +3V, and a voltage of the fourth sub-first electrode 214 is +4V. The voltage of the second electrode 22 is 0V. A voltage difference formed between the first sub-first electrode 211 and the second electrode 22 is 1V, a voltage difference formed between the second sub-first electrode 212 and the second electrode 22 is 2V, a voltage difference formed between the third sub-first electrode 213 and the second electrode 22 is 3V, and a voltage difference formed between the fourth sub-first electrode 214 and the second electrode 22 is 4V. A voltage difference formed between the fourth sub-first electrode 214 and a first sub-first electrode 211 in an adjacent grating unit 40 is 3V. The transverse electric field formed between the first electrodes 21 is relatively strong. When the alignment direction R1 of the first alignment layer 31 is opposite to the electric field direction of the first electric field TE1, the higher the electric field intensity of the first electric field TE1 is, the easier it is to cause liquid crystal molecules to fail to flip in conformity to the ideal situation; and the liquid crystal molecules rotate to a direction opposite to a pre-tilt angle, resulting in the problem of antiphase domains.

Exemplarily, referring to FIG. 5 and FIG. 6, multiple second electrodes 22 include first sub-second electrodes 221, second sub-second electrodes 222, third sub-second electrodes 223 and fourth sub-second electrodes 224. The voltage of the first sub-first electrode 211 is +0.5V, the voltage of the second sub-first electrode 212 is +1V, the voltage of the third sub-first electrode 213 is +1.5V, and the voltage of the fourth sub-first electrode 214 is +2V. A voltage of a first sub-second electrode 221 is −0.5V, a voltage of a second sub-second electrode 222 is −1V, a voltage of a third sub-second electrode 223 is −1.5V, and a voltage of a fourth sub-second electrode 224 is −2V. A voltage difference formed between the first sub-first electrode 211 and the first sub-second electrode 221 is 1V, a voltage difference formed between the second sub-first electrode 212 and the second sub-second electrode 222 is 2V, a voltage difference formed between the third sub-first electrode 213 and the third sub-second electrode 223 is 3V, and a voltage difference formed between the fourth sub-first electrode 214 and the fourth sub-second electrode 224 is 4V. The voltage difference formed between the fourth sub-first electrode 214 and the first sub-first electrode 211 in the adjacent grating unit 40 is 1.5V. A voltage difference formed between the fourth sub-second electrode 224 and a first sub-second electrode 221 in an adjacent grating unit is 1.5V. In this manner, the transverse electric field formed between first electrodes 21 is reduced; even the alignment direction R1 of the first alignment layer 31 is opposite to the electric field direction of the first electric field TE1, the adverse impact of the transverse electric field on the rotation of liquid crystal molecules can be reduced, and thus the problem of antiphase domains is alleviated.

Exemplarily, referring to FIG. 5 and FIG. 6, in various grating units 40 (including first grating units 401), first electrodes 21 of the same ordinal number have the same voltage, and second electrodes 22 of the same ordinal number have the same voltage. Multiple first electrodes 21 in various grating units 40 have the same voltage distribution rule, and multiple second electrodes 22 in various gating units 40 have the same voltage distribution rule. Therefore, first electrodes 21 having the same voltage in multiple grating units 40 may be connected to the same power supply terminal, and second electrodes 22 having the same voltage in multiple grating units may be connected to the same power supply terminal, so that the number of power supply terminals is reduced. The ordinal number of a first electrode 21 or the ordinal number of a second electrode 22 in a grating unit 40 refers to the ranking of the first electrode 21 or the ranking of the second electrode 22 in the grating unit 40. The voltage distribution rule of first electrodes 21 or the voltage distribution rule of second electrodes 22 refers to a distribution rule of voltages of multiple first electrodes 21 or a distribution rule of voltages of multiple second electrodes 22 along the first direction X.

Exemplarily, referring to FIG. 5 and FIG. 6, grating units 40 include first grating sub-units 41 and second grating sub-units 42. A first grating sub-unit 41 and a second grating sub-unit 42 each include four electrode groups 50. Each of electrode groups 50 (including first electrode groups 51) includes a first electrode 21 and a second electrode 22. In a grating unit 40, four first electrodes 21 are arranged in order, and four second electrodes 22 are arranged in order. The first first electrode 21 in a first grating subunit 41 has the same voltage as the first first electrode 21 in a second grating subunit 42, and the second first electrode 21 in the first grating subunit 41 has the same voltage as the second first electrode 21 in the second grating subunit 42. The first second electrode 22 in the first grating subunit 41 has the same voltage as the first second electrode 22 in the second grating subunit 42, and the second second electrode 22 in the first grating subunit 41 has the same voltage as the second second electrode 22 in the second grating subunit 42.

Figure 7:
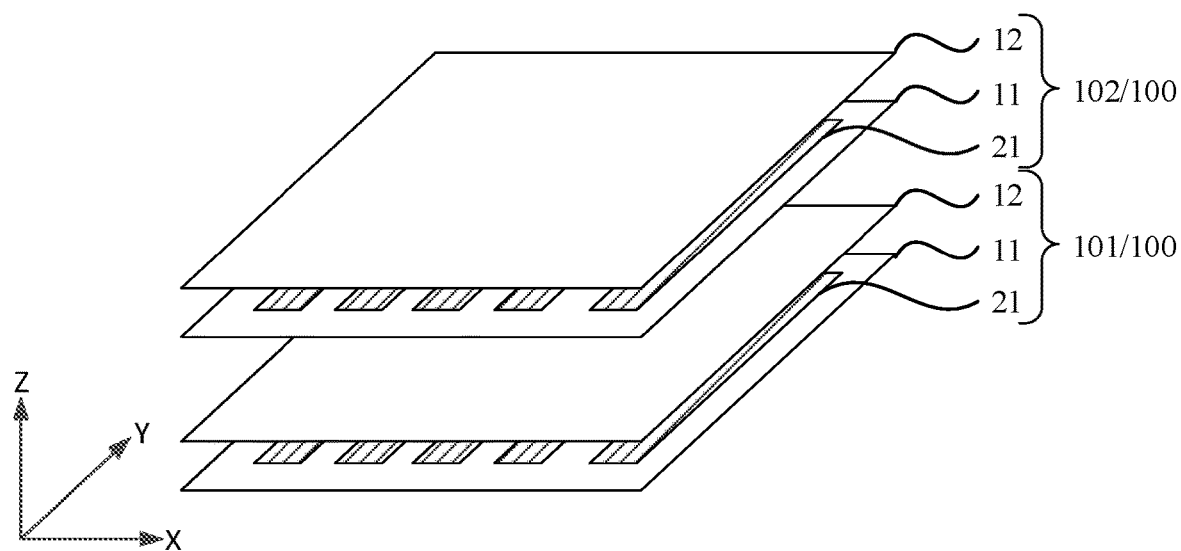
FIG. 7 is a diagram showing the three-dimensional structure of another liquid crystal grating according to an embodiment of the present disclosure.
Figure 8:
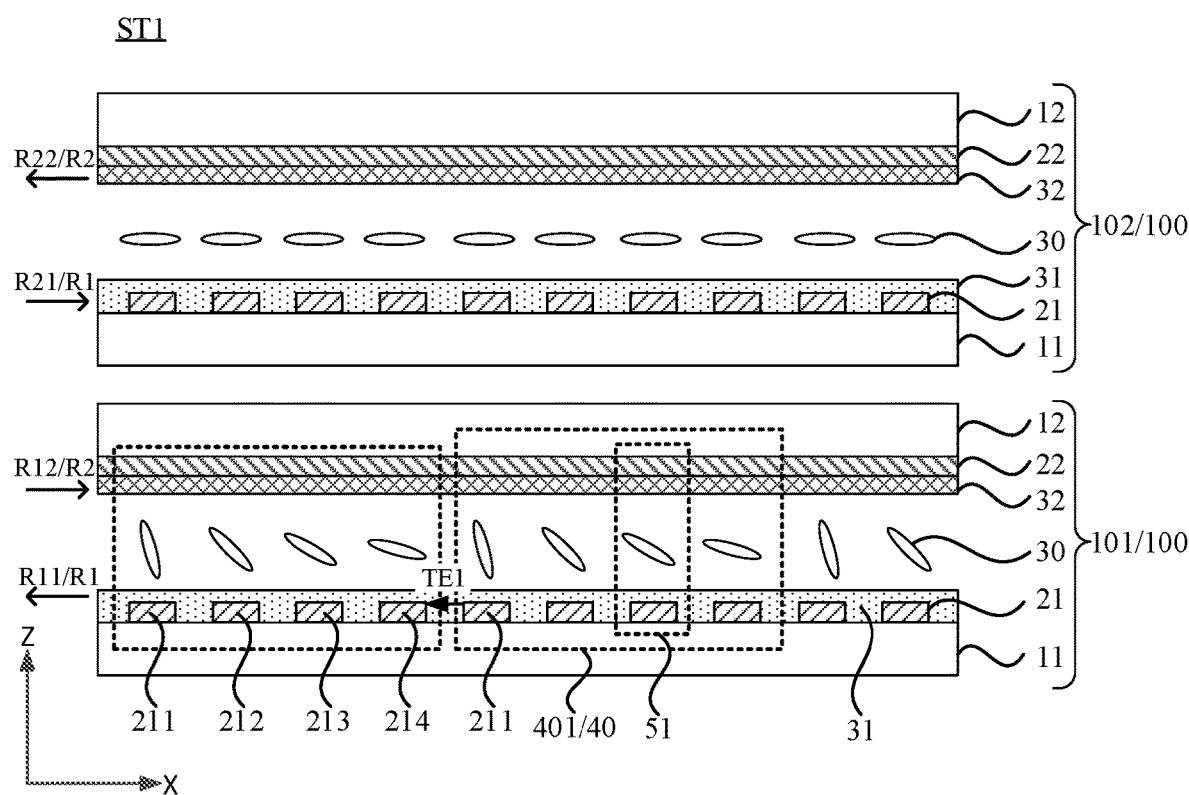
FIG. 8 is a sectional view of another liquid crystal grating according to an embodiment of the present disclosure.
Figure 9:
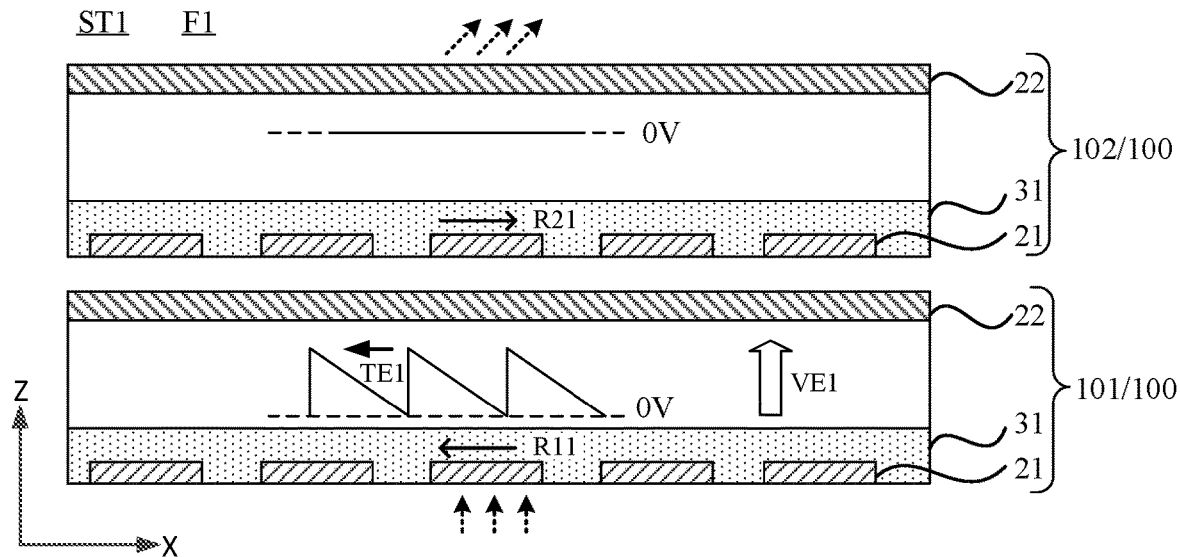
FIG. 9 is a diagram showing the operating process of a liquid crystal grating according to an embodiment of the present disclosure.

FIG. 7 is a diagram showing the three-dimensional structure of another liquid crystal grating according to an embodiment of the present disclosure, FIG. 8 is a sectional view of another liquid crystal grating according to an embodiment of the present disclosure, and FIG. 9 is a diagram showing the operating process of a liquid crystal grating according to an embodiment of the present disclosure. Referring to FIG. 7 to FIG. 9, the liquid crystal grating includes two liquid crystal cells 100 which are stacked. The two liquid crystal cells 100 are a first liquid crystal cell 101 and a second liquid crystal cell 102 respectively. In the first state ST1, the first liquid crystal cell 101 includes first grating units 401, and any two first electrodes 21 in the second liquid crystal cell 102 have the same voltage. In the second liquid crystal cell 102, voltage differences formed between any two first electrodes 21 and the second electrode 22 are the same, and electric field intensities of longitudinal electric fields formed between any two first electrodes 21 and the second electrode 22 are the same. Along the first direction X, intensities of longitudinal electric fields do not change. Due to the same intensity of longitudinal electric fields, liquid crystal molecules rotate by the same angle, no refractive index gradient is formed, and no grating having the diffraction function is formed. Therefore, the second liquid crystal cell 102 will not cause diffraction and deflection of light passing through the second liquid crystal cell 102.

Exemplarily, referring to FIG. 7 to FIG. 9, the two liquid crystal cells 100 are stacked along an optical axis of the liquid crystal grating, and light passes through the two liquid crystal cells 100. That is, the same light passes through both the first liquid crystal cell 101 and the second liquid crystal cell 102. The optical axis of the liquid crystal grating is perpendicular to the plane where the first substrate 11 is located. Dashed arrows in FIG. 9 represent the propagation direction of light. The vertically incident light, after passing through the first liquid crystal cell 101 and the second liquid crystal cell 102, is deflected towards the right side. In the first state ST1, in the first liquid crystal cell 101, the voltage of the first electrode 21 is a positive voltage, and the voltage of the second electrode 22 is 0V. A first longitudinal electric field VE1 is formed between the first electrode 21 and the second electrode 22, and a direction of the first longitudinal electric field VE1 is the third direction Z, pointing from the first electrode 21 to the second electrode 22. Along the first direction X, intensities of first longitudinal electric fields VE1 gradually decrease. The first longitudinal electric fields VE1 of different intensities cause liquid crystal molecules to rotate by different angles, so that a refractive index gradient is formed, and multiple first grating units 401 which are arranged along the first direction X are formed. The first grating units 401 form a grating having the diffraction and deflection function. In the embodiment of the present disclosure, the first liquid crystal cell 101 is configured for deflecting light. In the first liquid crystal cell 101, the alignment direction R1 of the first alignment layer 31 is the same as the electric field direction of the first electric field TE1. The alignment direction of the first alignment layer 31 in the first liquid crystal 101 is denoted as a first alignment direction R11. In the first state ST1, in the first liquid crystal cell 101, the first alignment direction R11 is the same as the electric field direction of the first electric field TE1.

The voltage of all first electrodes 21 in the second liquid crystal cell 102 is 0V, the voltage of the second electrode 22 is 0V, and no longitudinal electric field is formed between the first electrodes 21 and the second electrode 22. Along the first direction X, intensities of longitudinal electric fields do not change. In other implementations, the voltage of all electrodes 21 in the second liquid crystal cell 102 is 1V, the voltage of the second electrode 22 is 0V, and the voltage difference formed between the first electrodes 21 and the second electrode 22 is 1V. Along the first direction X, intensities of longitudinal electric fields do not change, so that no refractive index gradient is formed. In the first state ST1, the second liquid crystal cell 102 is not used for light deflection. In the second liquid crystal cell 102, since all first electrodes 21 have the same voltage, no transverse electric field is generated between adjacent first electrodes 21, so that the adverse impact of the transverse electric field on the rotation of liquid crystal molecules is avoided, and in the first state ST1, the problem of antiphase domains will not occur in the second liquid crystal cell 102. In the second state, the first liquid crystal cell 101 is not used for light deflection, while the second liquid crystal cell 102 is used for light deflection, so that the function of light deflection is split by two liquid crystal cells 100 and performed in two states in a time-division manner, respectively, and in the liquid crystal cell 100 (including the first liquid crystal cell 101 in the first state and the second liquid crystal cell 102 in the second state) mainly for diffraction and deflection, the alignment direction R1 of the first alignment layer 31 is the same as the electric field direction of the first electric field TE1. Therefore, the adverse impact of the transverse electric field on the rotation of liquid crystal molecules is reduced and the problem of antiphase domains is alleviated.

Figure 10:
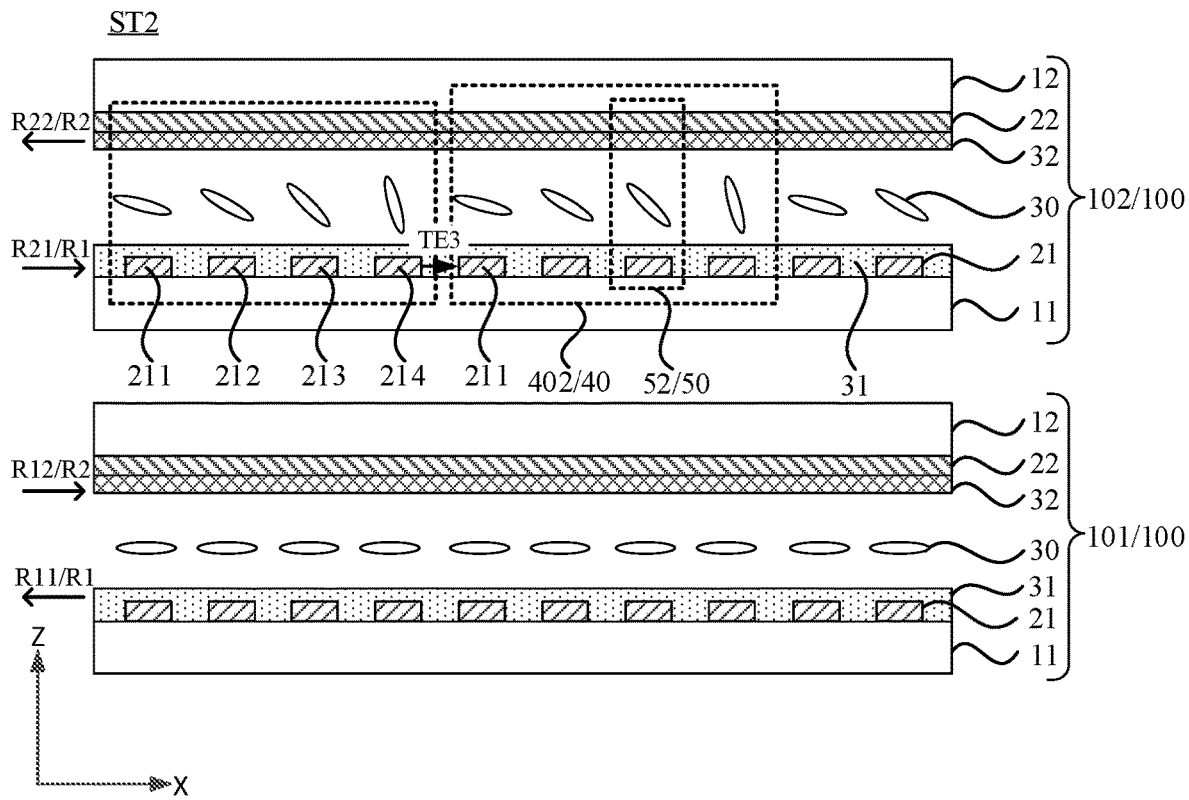
FIG. 10 is a sectional view of another liquid crystal grating according to an embodiment of the present disclosure.
Figure 11:
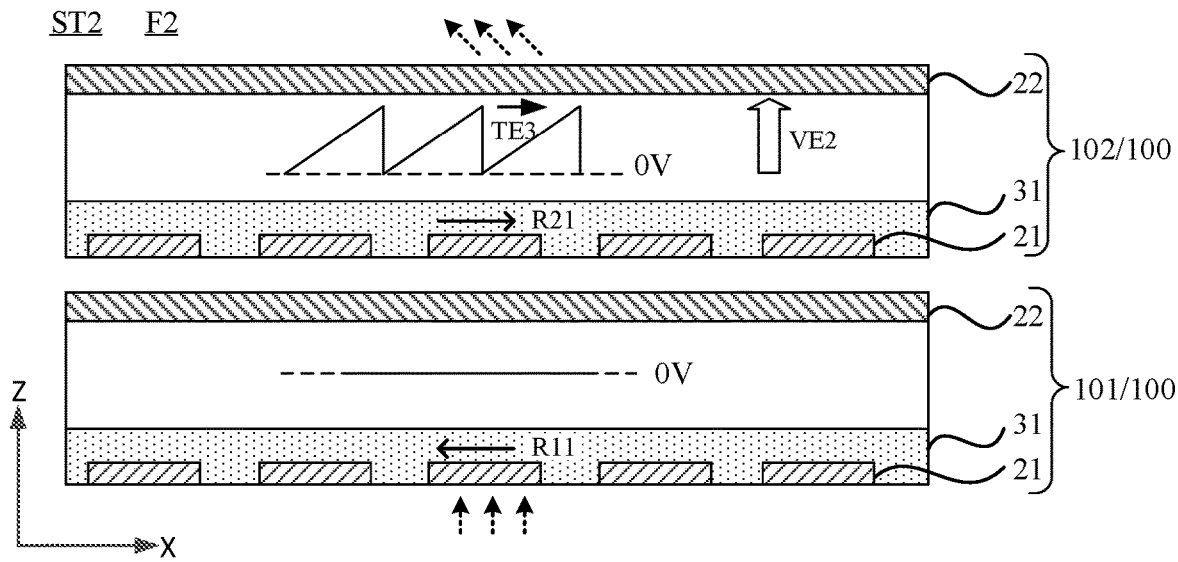
FIG. 11 is a diagram showing the operating process of another liquid crystal grating according to an embodiment of the present disclosure.

FIG. 10 is a sectional view of another liquid crystal grating according to an embodiment of the present disclosure, and FIG. 11 is a diagram showing the operating process of another liquid crystal grating according to an embodiment of the present disclosure. Referring to FIG. 10 and FIG. 11, in the second state ST2, the second liquid crystal cell 102 includes at least one second grating unit 402. A second grating unit 402 includes multiple first electrodes 21 which are disposed at intervals from each other along the first direction. A voltage variation trend of the multiple first electrodes 21 of the second grating unit 402 in the second state ST2 is opposite to a voltage variation trend of first electrodes 21 of the first grating unit 401 in the first state ST1. In the second state ST2, a third electric field TE3 is formed between two closest first electrodes 21 which are located in two adjacent second grating units 402, respectively. The third electric field TE3 is a transverse electric field. In the second liquid crystal cell 102, the alignment direction of the first alignment layer 31 is the same as an electric field direction of the third electric field TE3. In the embodiment of the present disclosure, in the second liquid crystal cell 102, the electric field direction of the third electric field TE3 is the same as the alignment direction of the first alignment layer 31. Therefore, the electric field direction affecting liquid crystal molecules close to the first alignment layer 31 is towards the alignment direction of the first alignment layer 31, and will not be towards the direction opposite to the alignment direction of the first alignment layer 31; the liquid crystal molecules close to the first alignment layer 31 will not flip to an opposite direction, so that the adverse impact of the transverse electric field on the rotation of the liquid crystal molecules is reduced and the problem of antiphase domains is alleviated.

Exemplarily, referring to FIG. 10 and FIG. 11, in the second state ST2, in the second liquid crystal cell 102, a second longitudinal electric field VE2 is formed between a first electrode 21 and the second electrode 22. A direction of the second longitudinal electric field VE2 is the third direction Z pointing from the first electrode 21 to the second electrode 22. Along the first direction X, intensities of second longitudinal electric fields VE2 gradually increase. The second longitudinal electric fields VE2 of different intensities cause liquid crystal molecules to rotate by different angles, so that a refractive index gradient is formed, and multiple second grating units 402 which are arranged along the first direction X are formed. The second grating units 402 form a grating having the diffraction and deflection function. In the embodiment of the present disclosure, the second liquid crystal cell 102 is used for deflecting light. In the second liquid crystal cell 102, the alignment direction R1 of the first alignment layer 31 is the same as the electric field direction of the first electric field TE1. The alignment direction of the first alignment layer 31 in the second liquid crystal 102 is denoted as a second alignment direction R21. In the second state ST2, in the second liquid crystal cell 102, the second alignment direction R21 is the same as the electric field direction of the third electric field TE3.

In the second state ST2, any two first electrodes 21 in the first liquid crystal cell 101 have the same voltage. In the first liquid crystal cell 101, voltage differences formed between any two first electrodes 21 and the second electrode 22 are the same, and electric field intensities of longitudinal electric fields formed between any two first electrodes 21 and the second electrode 22 are the same. Along the first direction X, intensities of longitudinal electric fields do not change. Due to the same intensity of longitudinal electric fields, liquid crystal molecules rotate by the same angle, no refractive index gradient is formed, and no grating having the diffraction function is formed. Therefore, in the second state ST2, the first liquid crystal cell 101 will not cause diffraction and deflection of light passing through the first liquid crystal cell 101. In the first liquid crystal cell 101, since all first electrodes 21 have the same voltage, no transverse electric field is generated between adjacent first electrodes 21, so that the adverse impact of the transverse electric field on the rotation of liquid crystal molecules is avoided, and in the second state ST2, the problem of antiphase domains will not occur in the first liquid crystal cell 101. The function of setting the first liquid crystal cell 101 and the second liquid crystal cell 102 is not repeated here, and reference may be made to the description of the embodiments related to FIG. 7 to FIG. 9.

Through the preceding embodiments, the liquid crystal grating can provide images to the left eye and the right eye separately, while the problem of antiphase domains is avoided; at the same time, the refresh frequency of a liquid crystal cell can be reduced and thus power consumption can be reduced.

Exemplarily, referring to FIG. 7 to FIG. 11, along the same first direction X, in the first state ST1, the voltage variation trend of first electrodes 21 in the first grating unit 401 is gradual decrease. In the second state ST2, the voltage variation trend of first electrodes 21 in the second grating unit 402 is gradual increase.

Figure 12:
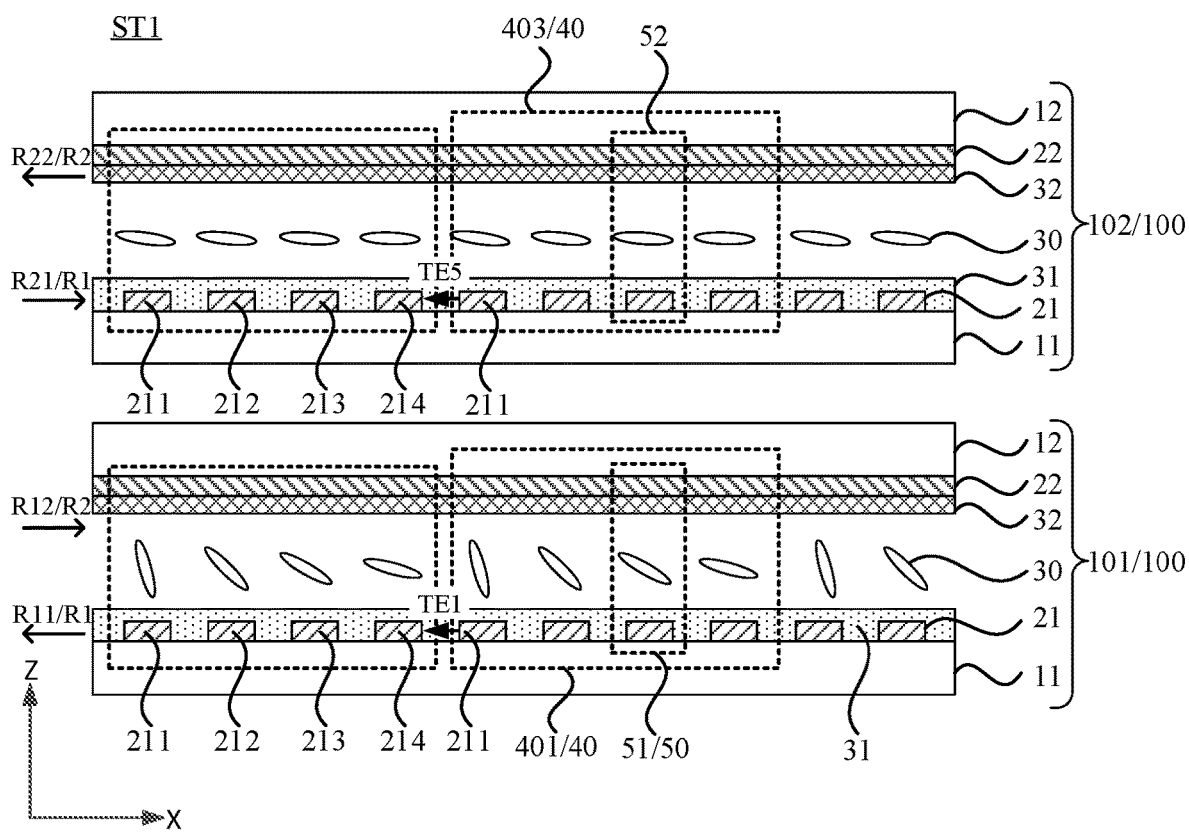
FIG. 12 is a sectional view of another liquid crystal grating according to an embodiment of the present disclosure.
Figure 13:
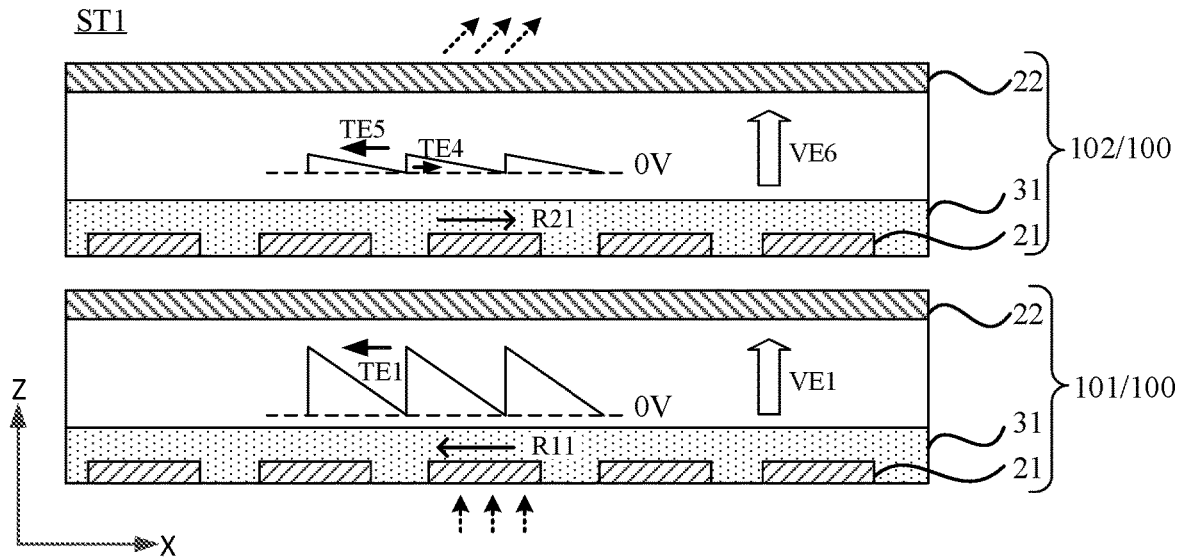
FIG. 13 is a diagram showing the operating process of another liquid crystal grating according to an embodiment of the present disclosure.

FIG. 12 is a sectional view of another liquid crystal grating according to an embodiment of the present disclosure, and FIG. 13 is a diagram showing the operating process of another liquid crystal grating according to an embodiment of the present disclosure. Referring to FIG. 12 and FIG. 13, the liquid crystal grating includes two liquid crystal cells 100 which are stacked, and the two liquid crystal cells 100 are a first liquid crystal cell 101 and a second liquid crystal cell 102 respectively. In the first state ST1, the first liquid crystal cell 101 includes first grating units 401, and the second liquid crystal cell 102 includes at least one third grating unit 403. A third grating unit 403 includes multiple first electrodes 21 which are disposed at intervals from each other along the first direction X. Referring to FIG. 12 and FIG. 13, along the first direction X, a fourth electric field TE4 is formed between two adjacent first electrodes 21 which are located in the same third grating unit 403, and an electric field direction of the fourth electric field TE4 is opposite to the electric field direction of the first electric field TE1. In the embodiment of the present disclosure, in the first state ST1, along the first direction X, a voltage variation trend of first electrodes 21 in a first grating unit 401 is the same as a voltage variation trend of first electrodes 21 in a third grating unit 403. The first liquid crystal cell 101 and the second liquid crystal cell 102 are both used for deflecting light to the first side of the optical axis of the liquid crystal grating. In the first state ST1, the first liquid crystal cell 101 is configured for light diffraction and deflection, and the second liquid crystal cell 102 assists in light deflection. The first liquid crystal cell 101 roughly deflects light to a preset position or by a preset angle as soon as possible, and the second liquid crystal cell 102 subtly corrects the deflection angle so that light is deflected to the preset position or by the preset angle.

Optionally, referring to FIG. 12 and FIG. 13, along the first direction X, a fifth electric field TE5 is formed between two closest first electrodes 21 which are located in two adjacent third grating units 403 respectively. The fifth electric field TE5 is a transverse electric field. In the second liquid crystal cell 102, the alignment direction R1 (that is, the second alignment direction R21) of the first alignment layer 31 is opposite to an electric field direction of the fifth electric field TE5. An absolute value of the fifth electric field TE5 is smaller than an absolute value of the first electric field TE1 In the embodiment of the present disclosure, on the one hand, in the first state ST1, the second liquid crystal cell 102 assists in light deflection, and the second liquid crystal cell 102 and the first liquid crystal cell 101 causes the same light deflection direction. On the other hand, the electric field intensity of the fifth electric field TE5 is relatively low; even if the second alignment direction R21 is opposite to the electric field direction of the fifth electric field TE5, the intensity of the fifth electric field TE5 is lower than the intensity of a transverse threshold electric field which will cause liquid crystal molecules to flip to an opposite direction, and the value of the fifth electric field TE5 is smaller than the value of the transverse electric field when bubble domains are generated; therefore, in the second liquid crystal cell 102, liquid crystal molecules close to the first alignment layer 31 will not flip to an opposite direction, so that the adverse impact of the transverse electric field on the rotation of the liquid crystal molecules is reduced and the problem of antiphase domains is alleviated.

Optionally, referring to FIG. 12 and FIG. 13, the same third grating unit 403 includes multiple second electrode groups 52 which are arranged along the first direction X. A second electrode 52 includes at least one first electrode 21 and at least one second electrode 22. In the same second electrode group 52, the first electrode 21 at least partially overlaps the second electrode 22. The first electrode 21 overlaps the second electrode 22, or the first electrode 21 partially overlaps the second electrode 22. A voltage difference formed between the first electrode 21 and the second electrode 22 is a second voltage difference, and a sixth electric field VE6 is formed between the first electrode 21 and the second electrode 22. The sixth electric field VE6 is a longitudinal electric field. The absolute value of the fifth electric field TE5 is smaller than an absolute value of a maximum value of the sixth electric field TE6. The second voltage difference is a difference between the voltage of the first electrode 21 and the voltage of the second electrode 22 in the third grating unit 403, that is, the second voltage difference is the voltage of the first electrode 21 minus the voltage of the second electrode 22. It is to be understood that along the first direction X, the distance between two adjacent first electrodes 21 is relatively small, so that an electric field of a higher intensity is easy to generate under a given voltage difference (such as 1V). Along the third direction Z, since a certain cell thickness needs to be kept for the liquid crystal layer 30, the distance between the first electrode 21 and the second electrode 22 is relatively large, so that an electric field of a lower intensity is easy to generate under a given voltage difference (such as 1V). In the embodiment of the present disclosure, the absolute value of the fifth electric field TE5 is smaller than the absolute value of the maximum value of the sixth electric field VE6, and the electric field intensity of the fifth electric field TE5 is much lower than the electric field intensity of the first electric field TE1. Even if the second alignment direction R21 is opposite to the electric field direction of the fifth electric field TE5, the problem of antiphase domains will not occur in the second liquid crystal cell 102.

Optionally, referring to FIG. 12 and FIG. 13, the liquid crystal layer 30 includes liquid crystal molecules. The absolute value of the maximum value of the sixth electric field VE6 is smaller than a threshold electric field value for driving the liquid crystal molecules to rotate. The absolute value of the maximum value of the sixth electric field VE6 is smaller than a value of a longitudinal electric field when bubble domains are generated. In the second liquid crystal cell 102, liquid crystal molecules close to the first alignment layer 31 will not flip to an opposite direction, so that the adverse impact of the transverse electric field on the rotation of the liquid crystal molecules is reduced and the problem of antiphase domains is alleviated.

Exemplarily, referring to FIG. 12 and FIG. 13, in the first state ST1, in the second liquid crystal cell 102, the voltage of the second electrode 22 is a common voltage. The voltage of the second electrode 22 may be, for example, a ground voltage or 0V, so that voltages of a positive frame and a negative frame may be exactly symmetrical. When the voltage of the second electrode 22 is 0V, the absolute value of the sixth electric field VE6 is in direct proportion to the absolute value of the voltage of the second electrode 22. The larger the absolute value of the sixth electric field VE6, the larger the absolute value of the voltage of the second electrode 22; the smaller the absolute value of the sixth electric field VE6, the smaller the absolute value of the voltage of the second electrode 22. When the voltage of the second electrode 22 is 0V and the voltage of the sixth electric field VE6 is a non-negative voltage (including 0V and a positive voltage), the voltage of the first electrode 21 (that is, the first sub-first electrode 211 in FIG. 12) corresponding to the maximum value of the sixth electric field VE6 is denoted as V1. The voltage difference between the first sub-first electrode 211 and the second electrode 22 satisfies that V1−0=V1. The voltage of the first electrode 21 (that is, the fourth sub-first electrode 214 in FIG. 12) corresponding to the minimum value of the sixth electric field VE6 is denoted as V2, and V2=V. The voltage difference between the fourth sub-first electrode 214 and the second electrode 22 satisfies that V2−0=V2=0V. A transverse voltage difference corresponding to the fifth electric field TE5 satisfies that V1−V2=V1−0=V1.

Optionally, referring to FIG. 12 and FIG. 13, the number of first electrodes 21 in a first grating unit 401 is the same as the number of first electrodes 21 in a third grating unit 403. In the two liquid crystal cells 100, the division of the first grating unit 401 and the third grating unit 403 remains unchanged, so that antiphase domains are avoided, and at the same time, the two liquid crystal cells 100 assist each other in deflecting light, reducing the burden on a single liquid crystal cell 100; moreover, the two liquid crystal cells 100 may use two circuits having the same function, so that the difficulty of circuit design is reduced.

Exemplarily, referring to FIG. 12 and FIG. 13, the number of first grating units 401 is the same as the number of third grating units 403. First electrodes 21 having the same voltage in multiple first grating units 401 may be connected to the same power supply terminal, and second electrodes 22 having the same voltage in multiple third grating units 403 may be connected to the same power supply terminal, so that the number of power supply terminals is reduced.

In other implementations, the sixth electric field VE6 may also not drive liquid crystal molecules to rotate, so that no refractive index gradient is formed, and no grating having the diffraction function is formed. The second liquid crystal cell 102 may not cause diffraction and deflection of light passing through the second liquid crystal cell 102.

It is to be noted that in the embodiment, FIG. 12 and FIG. 13 represent current states of the two liquid crystal cells 100 in the same frame, that is, states of the two liquid crystal cells 100 when an image is provided to one eye, that is, states of the two liquid crystal cells 100 in the same frame. At this time, the first liquid crystal cell 101 is configured for light deflection. Of course, in some embodiments of the present disclosure, when another frame of image is displayed, the liquid crystal grating is used for providing the image to the other eye. At this time, states of the two liquid crystal cells 100 are swapped, that is, the second liquid crystal cell 102 is configured for light deflection. At this time, the second liquid crystal cell 102 needs to be set by referring to the preceding requirements for the first liquid crystal cell 101, and the first liquid crystal cell 101 needs to be set by referring to the requirements for the second liquid crystal cell 102 in the preceding embodiment. In addition, the voltage variation trend of first electrodes 21 in the same grating unit 40 in the first liquid crystal cell 101 and the voltage variation trend of first electrodes 21 in the same grating unit 40 in the second liquid crystal cell 102 are gradual increase along the first direction X.

Figure 14:
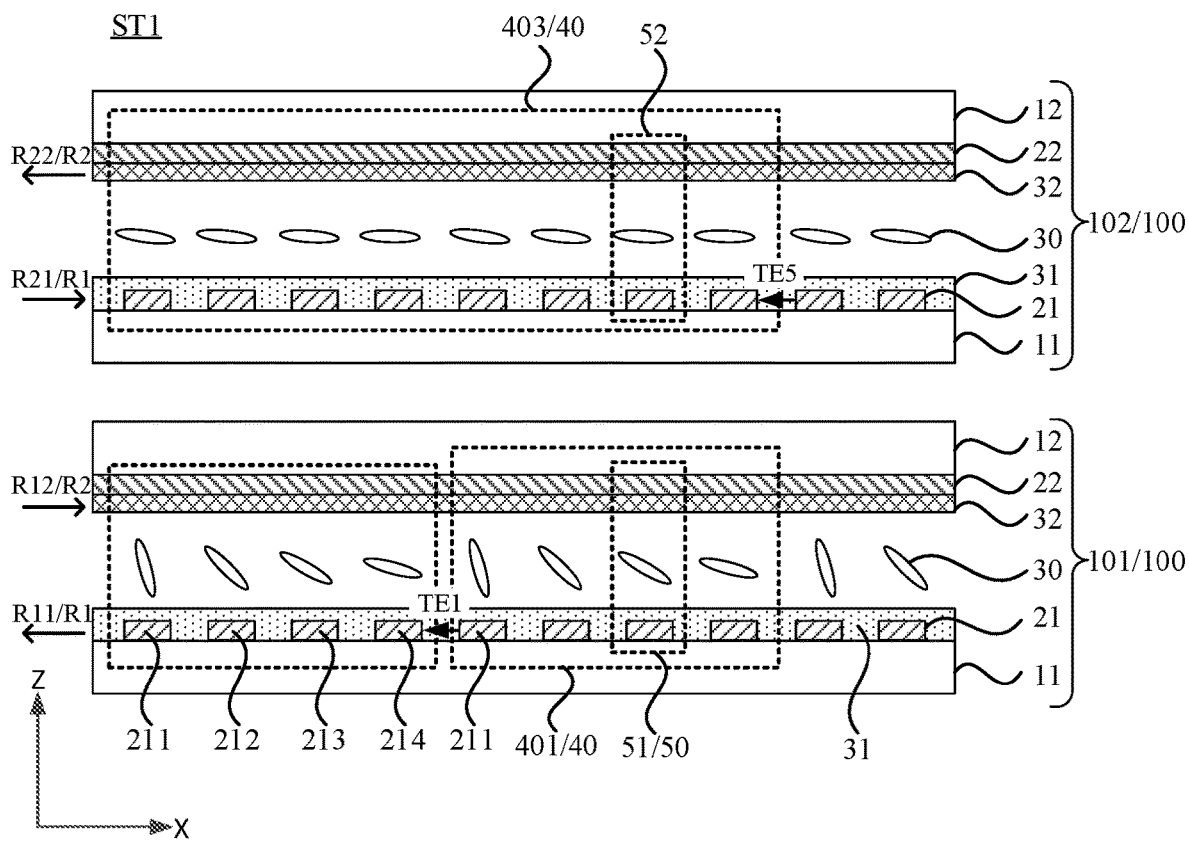
FIG. 14 is a sectional view of another liquid crystal grating according to an embodiment of the present disclosure.
Figure 15:
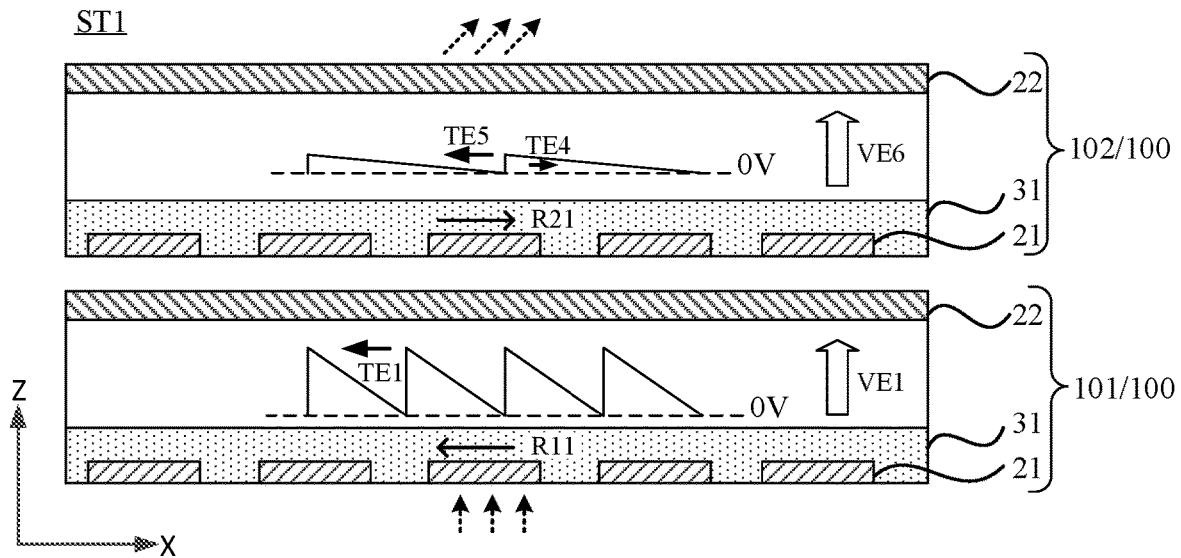
FIG. 15 is a diagram showing the operating process of another liquid crystal grating according to an embodiment of the present disclosure.

FIG. 14 is a sectional view of another liquid crystal grating according to an embodiment of the present disclosure, and FIG. 15 is a diagram showing the operating process of another liquid crystal grating according to an embodiment of the present disclosure. Referring to FIG. 14 and FIG. 15, the number of first grating units 401 in the first liquid crystal cell 101 is larger than the number of third grating units 403 in the second liquid crystal cell 102. Along the first direction X, a change period of the first longitudinal electric field VE1 is smaller than a change period of the sixth electric field VE6. The sixth electric field VE6 changes slowly, resulting in a smaller number of fifth electric fields TE5, so that the adverse impact of the fifth electric field TE5 on the rotation of liquid crystal molecules is reduced, and the problem of antiphase domains is alleviated.

Exemplarily, referring to FIG. 14 and FIG. 15, the number of first electrodes 21 in a first grating unit 401 is smaller than the number of first electrodes 21 in a third grating unit 403. The number of first grating units 401 in the first liquid crystal cell 101 is L times the number of third grating units 403 in the second liquid crystal cell 102, where L is a positive integer greater than 1.

Figure 16:
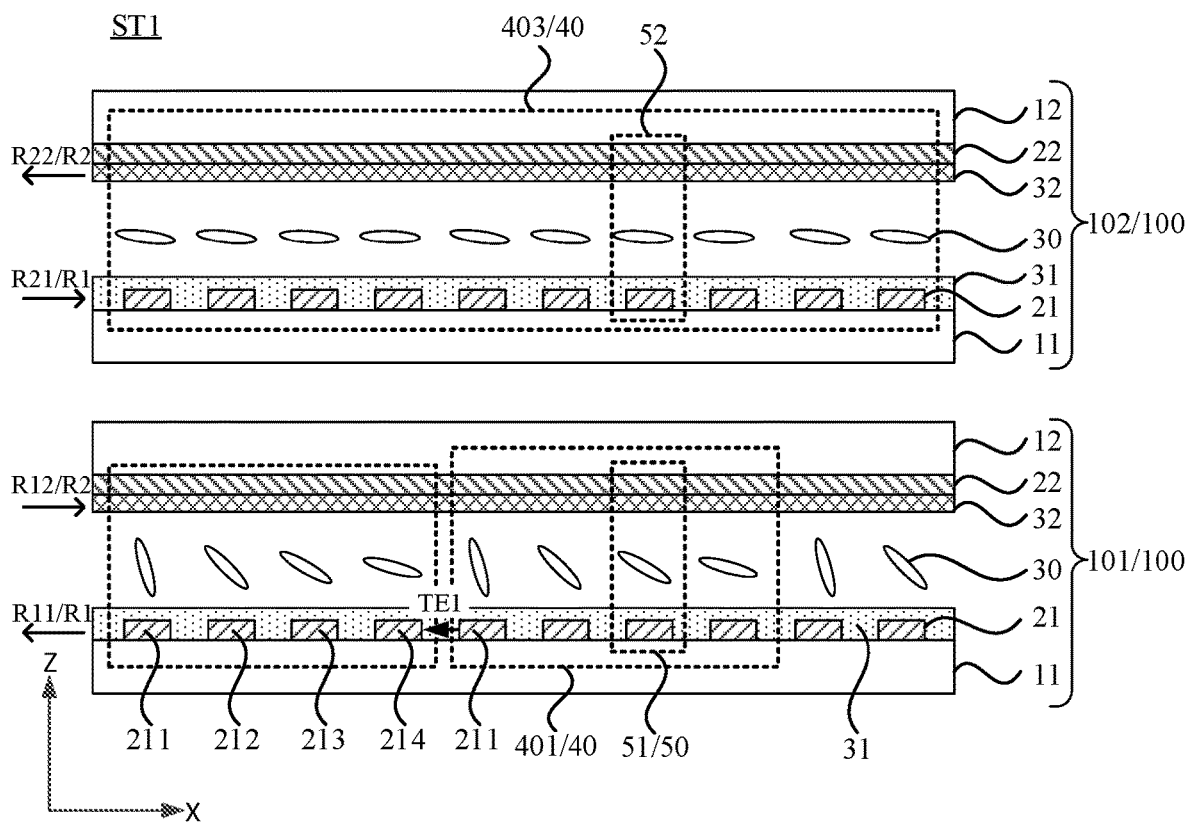
FIG. 16 is a sectional view of another liquid crystal grating according to an embodiment of the present disclosure.
Figure 17:
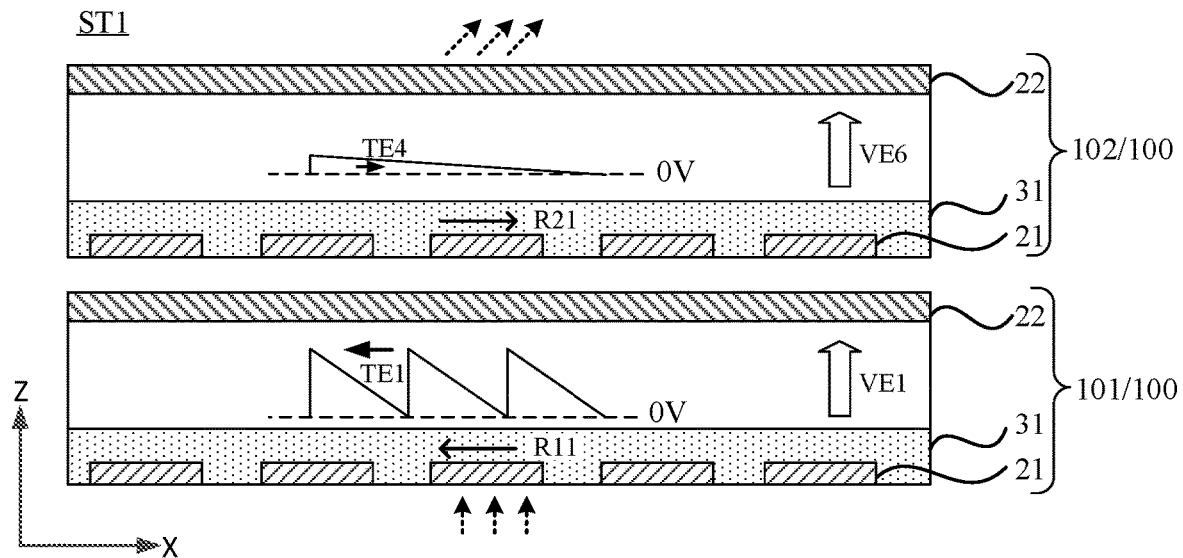
FIG. 17 is a diagram showing the operating process of another liquid crystal grating according to an embodiment of the present disclosure.

FIG. 16 is a sectional view of another liquid crystal grating according to an embodiment of the present disclosure, and FIG. 17 is a diagram showing the operating process of another liquid crystal grating according to an embodiment of the present disclosure. Referring to FIG. 16 and FIG. 17, in the first state ST1, the first liquid crystal cell 101 includes multiple first grating units 401, and the second liquid crystal cell 102 includes a third grating unit 403. In the third grating unit 403, voltages from the first first electrode 21 to the last first electrode 21 gradually increase or gradually decrease. In the embodiment of the present disclosure, since only one third grating unit 403 exists, no fifth electric field TE5 is generated, so that the adverse impact of the fifth electric field TE5 on the rotation of liquid crystal molecules is reduced, and the problem of antiphase domains in the second liquid crystal cell is avoided.

That is, only one third grating unit 403 exists in the second liquid crystal cell 102, that is, all first electrodes 21 in the second liquid crystal cell 102 form a grating unit 40. Along the first direction X, the voltage variation trend of all the first electrodes 21 in the second liquid crystal cell 102 is a gradual change.

In this design, the excessive transverse electric field between two grating units 40 in the second liquid crystal cell 102 is directly avoided, so that the second liquid crystal cell 102 is used for assisting the first liquid crystal cell 101 in light deflection, and the occurrence of antiphase domains in the second liquid crystal cell 102 is avoided.

Figure 18:
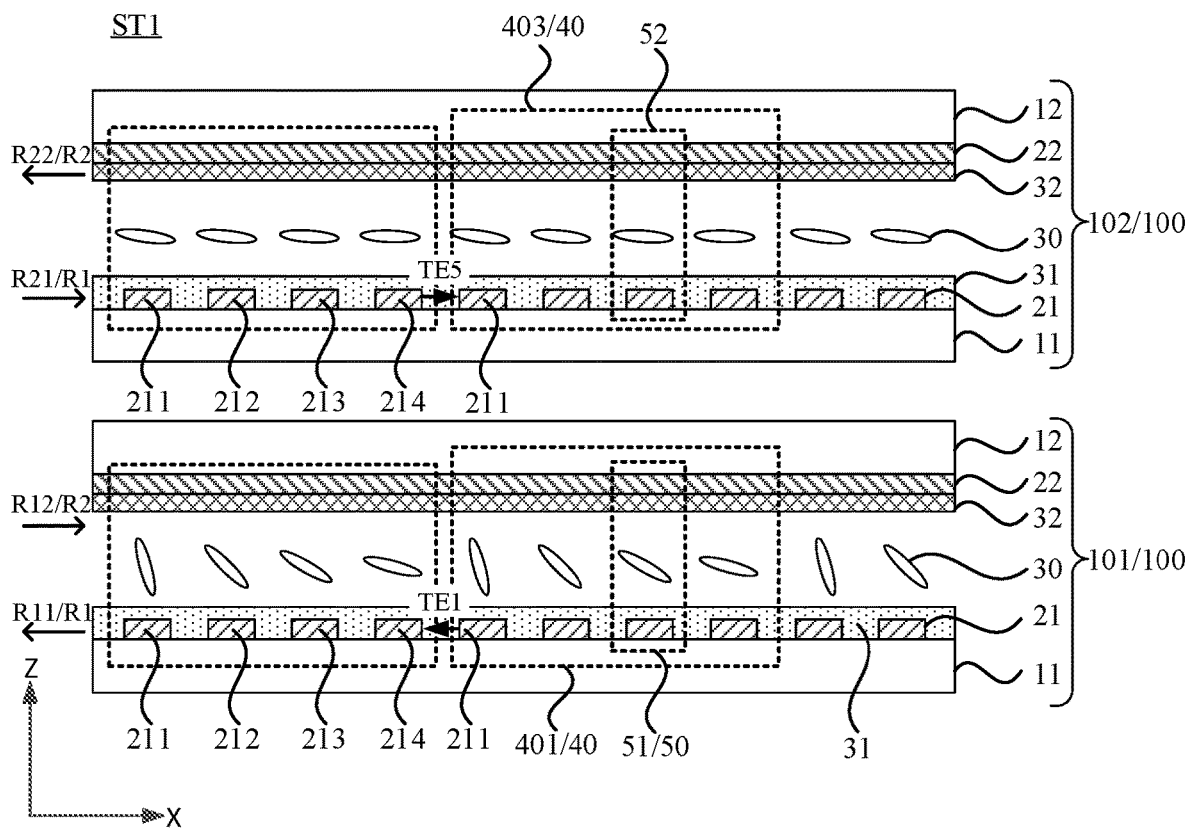
FIG. 18 is a sectional view of another liquid crystal grating according to an embodiment of the present disclosure.
Figure 19:
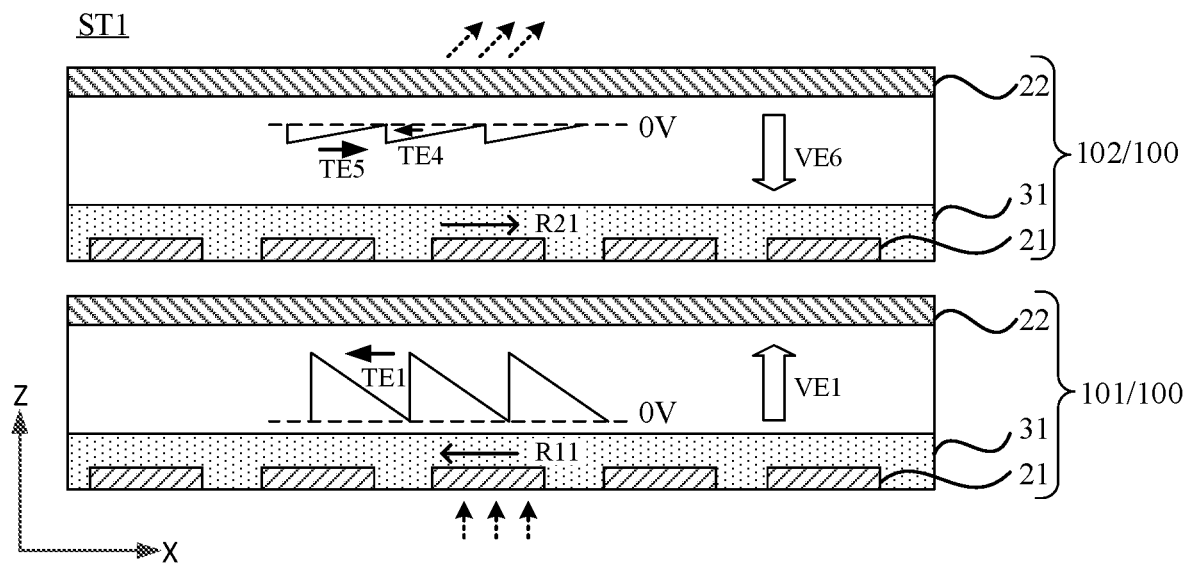
FIG. 19 is a diagram showing the operating process of another liquid crystal grating according to an embodiment of the present disclosure.

FIG. 18 is a sectional view of another liquid crystal grating according to an embodiment of the present disclosure, and FIG. 19 is a diagram showing the operating process of another liquid crystal grating according to an embodiment of the present disclosure. Referring to FIG. 18 and FIG. 19, the liquid crystal grating includes two liquid crystal cells 100 which are stacked, and the two liquid crystal cells 100 are a first liquid crystal cell 101 and a second liquid crystal cell 102 respectively. In the first state ST1, the first liquid crystal cell 101 includes first grating units 401, and the second liquid crystal cell 102 includes at least one third grating unit 403. A third grating unit 403 includes multiple first electrodes 21 which are disposed at intervals from each other along the first direction X. Along the first direction X, a fifth electric field TE5 is formed between two closest first electrodes 21 which are located in two adjacent third grating units 403 respectively. In the second liquid crystal cell 102, the alignment direction R1 (that is, the second alignment direction R21) of the first alignment layer 31 is opposite to the electric field direction of the fifth electric field TE5. The second alignment direction R21 is the same as the electric field direction of the fifth electric field TE5. In the second liquid crystal cell 102, the electric field direction affecting liquid crystal molecules close to the first alignment layer 31 is towards the second alignment direction R21, so that the liquid crystal molecules close to the first alignment layer 31 do not flip to an opposite direction. In the embodiment of the present disclosure, in the first state ST1, along the first direction X, the voltage variation trend of first electrodes 21 in the first grating unit 401 is opposite to the voltage variation trend of first electrodes 21 in a third grating unit 403. The first liquid crystal cell 101 is used for deflecting light towards the first side of the optical axis of the liquid crystal grating, and the second liquid crystal cell 102 is used for deflecting light towards the second side of the optical axis of the liquid crystal grating. In the first state ST1, the first liquid crystal cell 101 is mainly configured for light diffraction and deflection, and the second liquid crystal cell 102 assists in light deflection.

Optionally, referring to FIG. 18 and FIG. 19, the alignment direction R1 of the first alignment layer 31 in the first liquid crystal cell 101 is different from the alignment direction R1 of the first alignment layer 31 in the second liquid crystal cell 102, that is, the first alignment direction R11 is different from the second alignment direction R21. In the first state ST1, the electric field direction of the first electric field TE1 is opposite to the electric field direction of the fifth electric field TE5. In the first state ST1, the voltage of a first electrode 21 in the first liquid crystal cell 101 and the voltage of a first electrode 21 in the second liquid crystal cell 102 have opposite polarities. The direction of the first longitudinal electric field VE1 is the third direction Z, in the first liquid crystal cell 101, pointing from the first electrode 21 to the second electrode 22. Along the first direction X, intensities of first longitudinal electric fields VE1 gradually decrease. The first longitudinal electric fields VE1 of different intensities cause liquid crystal molecules to rotate by different angles, so that a refractive index gradient is formed. In the embodiment of the present disclosure, the first liquid crystal cell 101 is mainly configured for deflecting light. The direction of the sixth electric field VE6 is the opposite direction of the third direction Z, in the first liquid crystal cell 102, pointing from the second electrode 22 to the first electrode 21. Along the first direction X, intensities of sixth longitudinal electric fields VE6 gradually decrease. The sixth longitudinal electric fields VE6 of different intensities cause liquid crystal molecules to rotate by different angles, so that a refractive index gradient is formed. In the embodiment of the present disclosure, the second liquid crystal cell 102 assists in deflecting light. In the embodiment of the present disclosure, in the first liquid crystal cell 101, the electric field direction of the first electric field TE1 is the same as the first alignment direction R11, so that the problem of antiphase domains will not occur in the first liquid crystal cell 101. In the second liquid crystal cell 102, the electric field direction of the fifth electric field TE5 is the same as the second alignment direction R21, so that the problem of antiphase domains will not occur in the second liquid crystal cell 102.

Exemplarily, referring to FIG. 18 and FIG. 19, the first alignment direction R11 is opposite to the second alignment direction R21, the electric field direction of the fourth electric field TE4 is opposite to the electric field direction of the first electric field TE1, and the electric field direction of the first longitudinal electric field VE1 is opposite to the electric field direction of the sixth electric field VE6. In the first state ST1, along the first direction X, the voltage variation trend of the first electrodes 21 in the first grating unit 401 is the same as the voltage variation trend of the first electrodes 21 in the third grating unit 403. The first liquid crystal cell 101 and the second liquid crystal cell 102 are both used for deflecting light to the first side of the optical axis of the liquid crystal grating.

In the first state ST1, the voltage of the first electrode 21 in the first grating unit 401 may be a positive voltage or a negative voltage. A detailed explanation is provided below. The first state ST1 represents current states of the two liquid crystal cells 100 in the same frame F (for example, in a first frame F1). In the first state ST1, the first liquid crystal cell 101 is configured for deflecting light, while the second liquid crystal cell 102 is not used for or assists in deflecting light. The second state ST2 represents current states of the two liquid crystal cells 100 in the same frame F (for example, in a second frame F2). In the second state ST2, the second liquid crystal cell 102 is configured for deflecting light, while the first liquid crystal cell 101 is not used for or assists in deflecting light.

Exemplarily, referring to FIG. 8 and FIG. 9, in the first state ST1, along the first direction X, voltages of first electrodes 21 in the first grating unit 401 gradually decrease, and the voltages of the first electrodes 21 in the first grating unit 401 are positive voltages.

Figure 20:
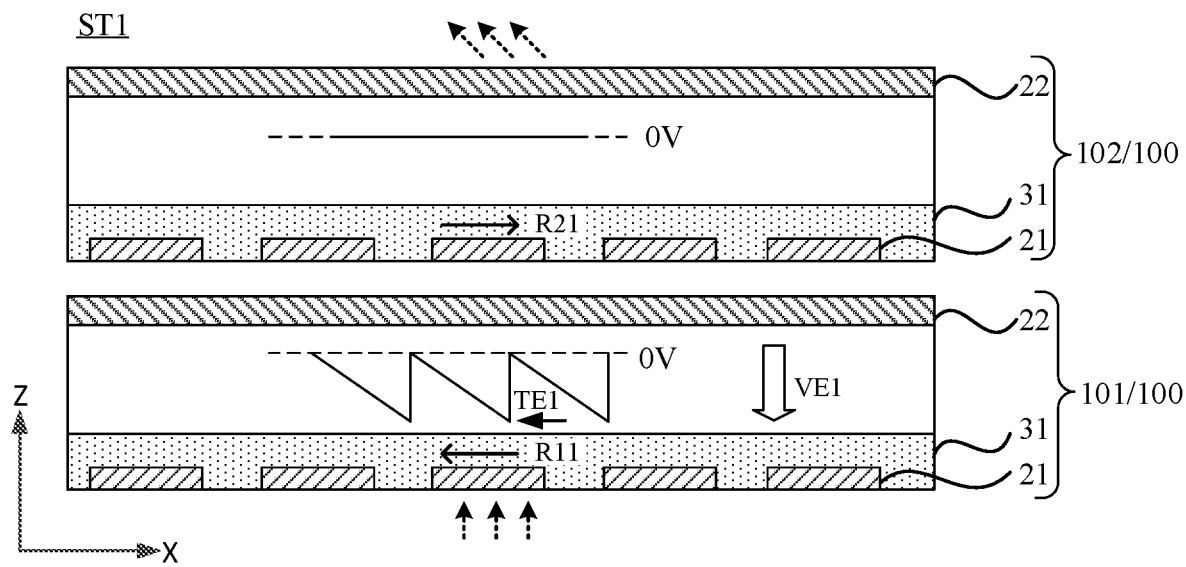
FIG. 20 is a diagram showing the operating process of another liquid crystal grating according to an embodiment of the present disclosure.

FIG. 20 is a diagram showing the operating process of another liquid crystal grating according to an embodiment of the present disclosure. Referring to FIG. 8 and FIG. 20, in the first state ST1, along the first direction X, the voltages of the first electrodes 21 in the first grating unit 401 gradually decrease, and the voltages of the first electrodes 21 in the first grating unit 401 are negative voltages. The electric direction of the first electric field TE1 is the same as the first alignment direction R11, so that the problem of antiphase domains will not occur in the first liquid crystal cell 101.

In addition to containing liquid crystal molecules, the liquid crystal layer 30 also includes impurities, which will move towards the first electrode 21 or the second electrode 22 under the action of an electric field. Therefore, when the same liquid crystal cell 100 operates in a manner of positive-negative frame transformation, the direction of a longitudinal electric field formed by the positive frames may be opposite to the direction of a longitudinal electric field formed by the negative frames, so that in the positive frames, the impurities move towards the first electrode 21, and in the negative frames, the impurities move towards the second electrode 22; or in the positive frames, the impurities move towards the second electrode 22, and in the negative frames, the impurities move towards the first electrode 21; in this manner, the impurities are prevented from accumulating on one side. A detailed explanation of the first liquid crystal cell 101 working in a positive frame and a negative frame is provided below.

Exemplarily, referring to FIG. 9, in the first liquid crystal cell 101, the impurities in the liquid crystal layer 30 move towards the second electrode 22 side driven by the longitudinal electric field towards the third direction Z. Referring to FIG. 20, in the first liquid crystal cell 101, the impurities in the liquid crystal layer 30 move towards the first electrode 21 side driven by the longitudinal electric field towards the opposite direction of the third direction Z. The operating time of the liquid crystal grating includes multiple frames, and in different frames, the longitudinal electric field in the first liquid crystal cell 101 may be alternately towards the third direction Z and the opposite direction of the third direction Z so that the impurities are prevented from accumulating on one side.

In the second state ST2, the voltage of the first electrode 21 in the second grating unit 402 may be a positive voltage or a negative voltage. A detailed explanation is provided below.

Exemplarily, referring to FIG. 10 and FIG. 11, in the second state ST2, along the first direction X, voltages of first electrodes 21 in the second grating unit 402 gradually increase, and the voltages of the first electrodes 21 in the second grating unit 402 are positive voltages.

Figure 21:
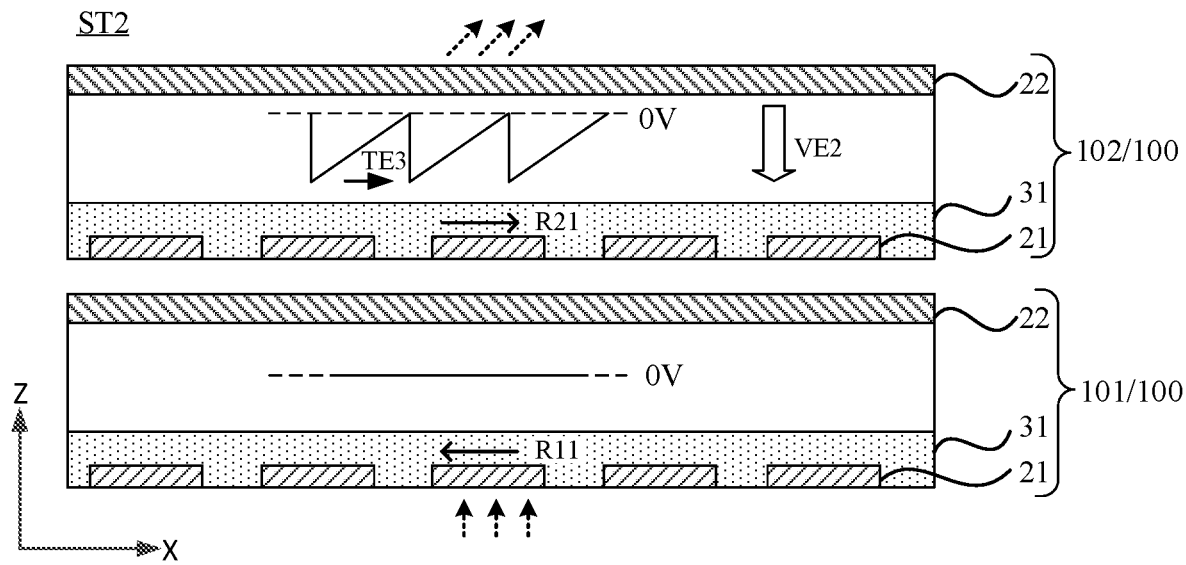
FIG. 21 is a diagram showing the operating process of another liquid crystal grating according to an embodiment of the present disclosure.

FIG. 21 is a diagram showing the operating process of another liquid crystal grating according to an embodiment of the present disclosure. Referring to FIG. 10 and FIG. 21, in the second state ST2, along the first direction X, the voltages of the first electrodes 21 in the first grating unit 402 gradually increase, and the voltages of the first electrodes 21 in the second grating unit 402 are negative voltages. The electric direction of the third electric field TE3 is the same as the second alignment direction R21, so that the problem of antiphase domains will not occur in the second liquid crystal cell 102.

A detailed explanation of the second liquid crystal cell 102 working in a positive frame and a negative frame is provided below. Exemplarily, referring to FIG. 11, in the second liquid crystal cell 102, the impurities in the liquid crystal layer 30 move towards the second electrode 22 side driven by the longitudinal electric field towards the third direction Z. Referring to FIG. 21, in the second liquid crystal cell 102, the impurities in the liquid crystal layer 30 move towards the first electrode 21 side driven by the longitudinal electric field towards the opposite direction of the third direction Z. The operating time of the liquid crystal grating includes multiple frames, and in different frames, the longitudinal electric field in the second liquid crystal cell 102 may be alternately towards the third direction Z and the opposite direction of the third direction Z so that the impurities are prevented from accumulating on one side.

In the preceding embodiments, the first alignment direction R11 is different from the second alignment direction R21. In other implementations, the first alignment direction R11 may be the same as the second alignment direction R21.

Figure 22:
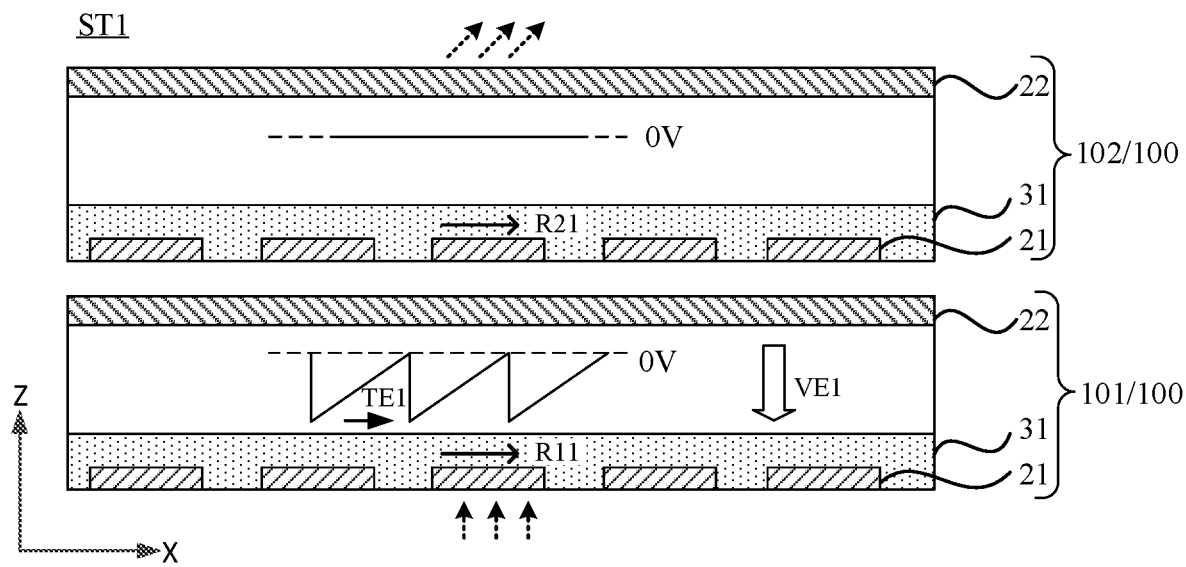
FIG. 22 is a diagram showing the operating process of another liquid crystal grating according to an embodiment of the present disclosure.

FIG. 22 is a diagram showing the operating process of another liquid crystal grating according to an embodiment of the present disclosure. Referring to FIG. 22, the first alignment direction R11 is the same as the second alignment direction R21. The electric field direction of the first longitudinal electric field VE1 is the opposite direction of the third direction Z. In the first state ST1, along the first direction X, voltages of first electrodes 21 in the first grating unit 401 gradually increase, and the voltages of the first electrodes 21 in the first grating unit 401 are negative voltages. The electric direction of the first electric field TE1 is the same as the first alignment direction R11, so that the problem of antiphase domains will not occur in the first liquid crystal cell 101.

Figure 23:
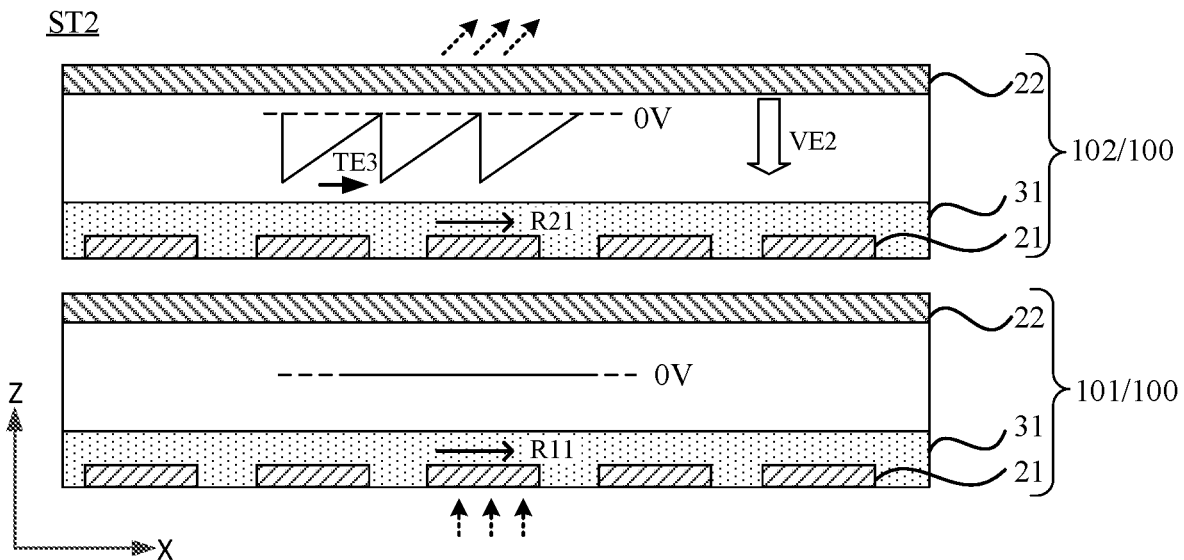
FIG. 23 is a diagram showing the operating process of another liquid crystal grating according to an embodiment of the present disclosure.

FIG. 23 is a diagram showing the operating process of another liquid crystal grating according to an embodiment of the present disclosure. Referring to FIG. 23, the first alignment direction R11 is the same as the second alignment direction R21. The electric field direction of the second longitudinal electric field VE2 is the opposite direction of the third direction Z. In the second state ST2, along the first direction X, voltages of first electrodes 21 in the second grating unit 402 gradually increase, and the voltages of the first electrodes 21 in the second grating unit 402 are negative voltages. The electric direction of the third electric field TE3 is the same as the second alignment direction R21, so that the problem of antiphase domains will not occur in the second liquid crystal cell 102.

In an implementation, the liquid crystal cell 100 may include multiple first electrodes 21 and multiple second electrodes 22. A detailed explanation based on the alignment direction and the electric field direction in the liquid crystal cell 100 of this structure is provided below.

Figure 24:
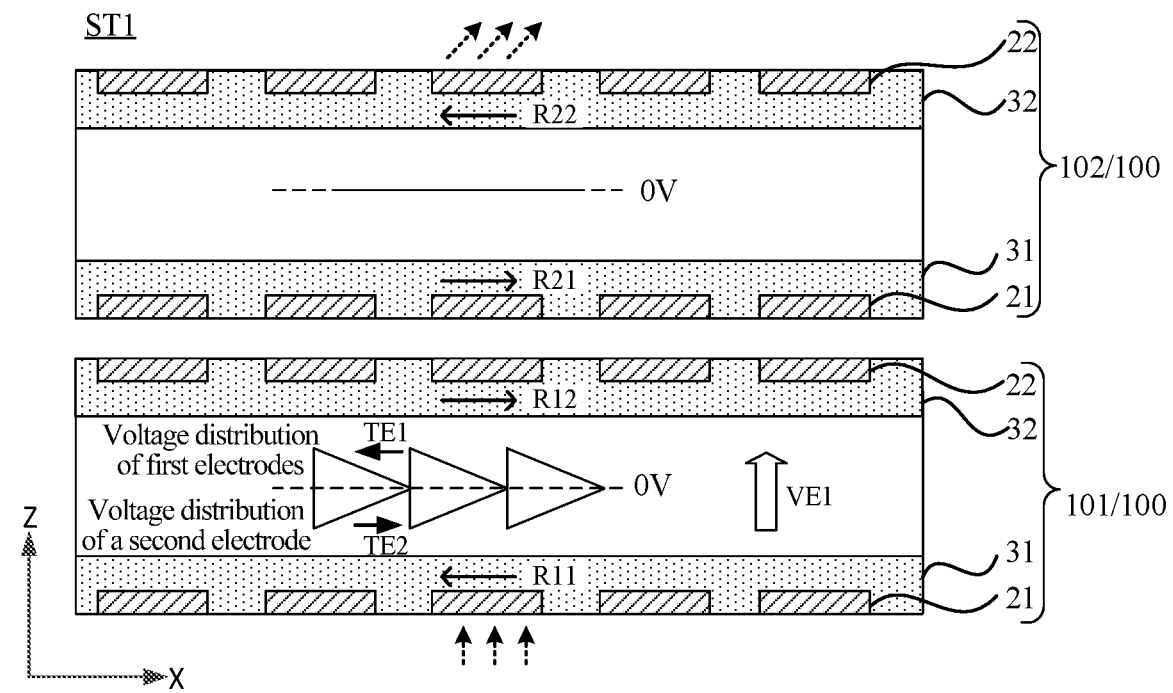
FIG. 24 is a diagram showing the operating process of another liquid crystal grating according to an embodiment of the present disclosure.

FIG. 24 is a diagram showing the operating process of another liquid crystal grating according to an embodiment of the present disclosure. Referring to FIG. 5 and FIG. 24, in the first state ST1, in the first liquid crystal cell 101, the first alignment direction R11 is the same as the electric direction of the first electric field TE1, so that liquid crystal molecules close to the first alignment layer 31 will not flip to an opposite direction. The alignment direction of the second alignment layer 32 in the first liquid crystal 101 is denoted as a third alignment direction R12. In the first state ST1, in the first liquid crystal cell 101, the third alignment direction R12 is the same as the electric field direction of the second electric field TE2, so that liquid crystal molecules close to the second alignment layer 32 will not flip to an opposite direction. The first alignment direction R11 is opposite to the third alignment direction R12.

Figure 25:
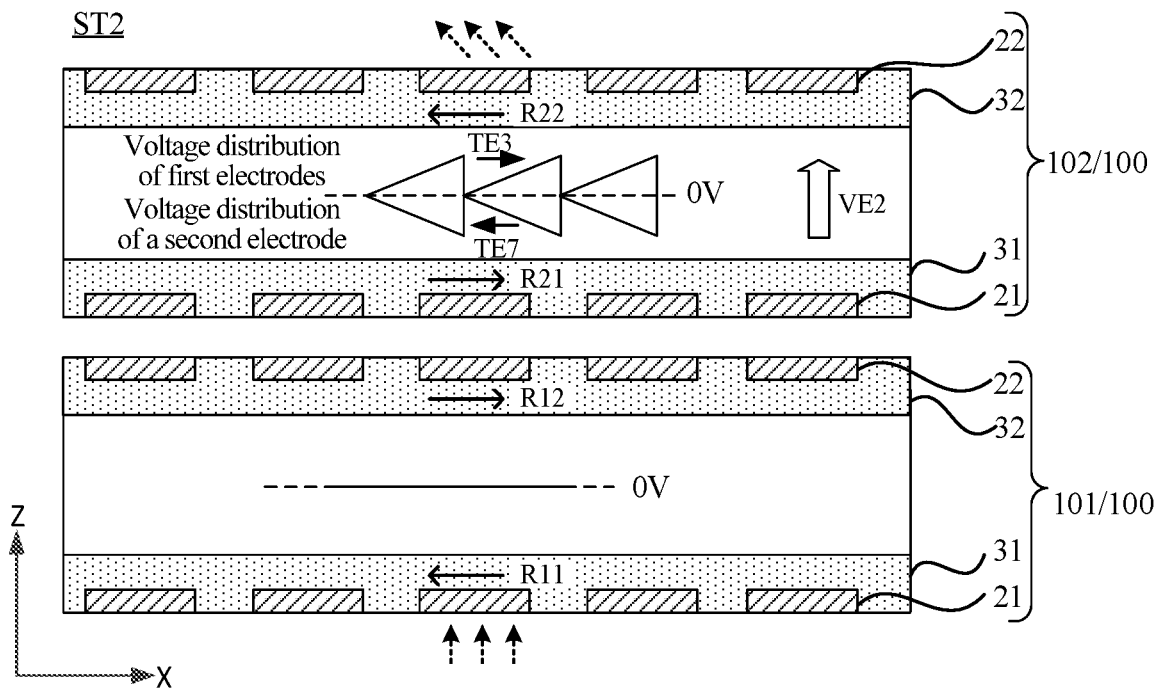
FIG. 25 is a diagram showing the operating process of another liquid crystal grating according to an embodiment of the present disclosure.

FIG. 25 is a diagram showing the operating process of another liquid crystal grating according to an embodiment of the present disclosure. Referring to FIG. 5 and FIG. 25, in the second state ST2, in the second liquid crystal cell 102, the second alignment direction R21 is the same as the electric direction of the third electric field TE3, so that liquid crystal molecules close to the first alignment layer 31 will not flip to an opposite direction. The alignment direction of the second alignment layer 32 in the second liquid crystal 102 is denoted as a fourth alignment direction R22. In the second state ST2, in the second liquid crystal cell 102, the fourth alignment direction R22 is the same as an electric field direction of a seventh electric field TE7, so that liquid crystal molecules close to the second alignment layer 32 will not flip to an opposite direction. The second alignment direction R21 is opposite to the fourth alignment direction R22. In the second liquid crystal cell 102, in the second state ST2, along the first direction X, the seventh electric field TE7 is formed between two closest second electrodes 22 which are located in two adjacent grating units 40 respectively. The seventh electric field TE7 is a transverse electric field.

Figure 26:
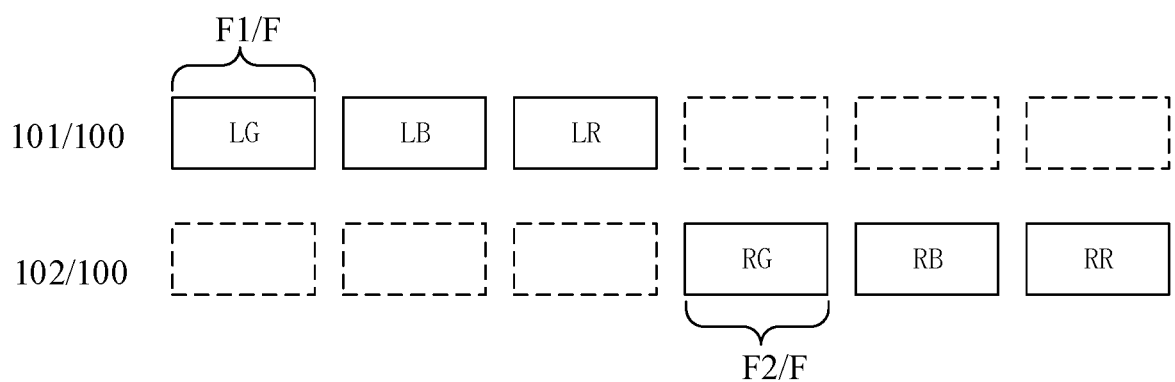
FIG. 26 is a timing graph showing the operations of a liquid crystal grating according to an embodiment of the present disclosure.

FIG. 26 is a timing graph showing the operations of a liquid crystal grating according to an embodiment of the present disclosure. Referring to FIG. 7 to FIG. 11 and FIG. 26, the liquid crystal grating includes two liquid crystal cells 100 which are stacked. The operating time of the liquid crystal grating includes multiple frames F. In the same frame F, one of the two liquid crystal cells 100 is configured for light diffraction and deflection, and the other one of the two liquid crystal cells 100 is not configured for or assists in light diffraction and deflection. The deflection angle of light is mainly determined by one of the two liquid crystal cells 100.

Exemplarily, referring to FIG. 26, a frame F refers to a time period during which light of a color illuminates an eye of the observer. For a scheme using three primary colors, that is, red, green and blue (RGB), for color display, a complete image during stereoscopic display requires six frames. These six frames are a left-eye green frame LG, a left-eye blue frame LB, a left-eye red frame LR, a right-eye green frame RG, a right-eye blue frame RB and a right-eye red frame RR, respectively. Dashed boxes in FIG. 26 indicate that the liquid crystal cell is not used for or assists in light deflection. For example, in the left-eye green frame LG, the first liquid crystal cell 101 is mainly configured for diffracting and deflecting light to the left eye of the observer, and the second liquid crystal cell 102 is not used for or assists in light deflection. In the right-eye green frame RG, the first liquid crystal cell 101 is not used for or assists in light deflection, and the second liquid crystal cell 102 is mainly configured for diffracting and deflecting light to the right eye of the observer.

Optionally, referring to FIG. 7 to FIG. 11 and FIG. 26, the two liquid crystal cells 100 are the first liquid crystal cell 101 and the second liquid crystal cell 102 respectively. The multiple frames F include first frames F1 and second frames F2, and the second frames F2 are placed after the first frames F1. In the first frames F1, the first liquid crystal cell 101 operates in the first state ST1 and is configured mainly to diffract and deflect light towards the first side of the optical axis of the liquid crystal grating. In the second frames F2, the second liquid crystal cell 102 operates in the second state ST2 and is configured mainly to diffract and deflect light towards the second side of the optical axis of the liquid crystal grating, where the first side and the second side are located at two opposite sides of the optical axis of the liquid crystal grating. The optical axis of the liquid crystal grating is perpendicular to the plane where the first substrate 11 is located.

Exemplarily, referring to FIG. 7 to FIG. 9 and FIG. 26, in the first frames F1, the first liquid crystal cell 101 operates in the first state ST1, and the first liquid crystal cell 101 is configured mainly to diffract and deflect light towards the first side of the optical axis of the liquid crystal grating. The first side of the optical axis of the liquid crystal grating is the right side of the optical axis of the liquid crystal grating. For the observer facing the direction of light propagation, green light (green light is used for illustration but is not limiting) is deflected into the left eye of the observer.

Exemplarily, referring to FIG. 10, FIG. 11 and FIG. 26, in the second frames F2, the second liquid crystal cell 102 operates in the second state ST2, and the second liquid crystal cell 102 is configured mainly to diffract and deflect light towards the second side of the optical axis of the liquid crystal grating. The second side of the optical axis of the liquid crystal grating is the left side of the optical axis of the liquid crystal grating. For the observer facing the direction of light propagation, green light (green light is used for illustration but is not limiting) is deflected into the right eye of the observer.

Optionally, referring to FIG. 7 to FIG. 11 and FIG. 26, in the first frames F1, in the same first grating unit 401 of the first liquid crystal cell 101, voltages of various first electrodes 21 gradually decrease along the first direction. The first liquid crystal cell 101 is configured mainly to diffract and deflect light towards the first side of the optical axis of the liquid crystal grating. In the second frames F2, in the same second grating unit 402 of the second liquid crystal cell 102, voltages of various first electrodes 21 gradually increase along the first direction X. The second liquid crystal cell 102 is configured mainly to diffract and deflect light towards the second side of the optical axis of the liquid crystal grating.

Optionally, referring to FIG. 7 to FIG. 11 and FIG. 26, the voltages of the first electrodes 21 in the first liquid crystal cell 101 in the first frames F1 have the same polarity as the voltages of the first electrodes 21 in the second liquid crystal cell 102 in the second frames F2. In an example, the voltages of the first electrodes 21 in the first liquid crystal cell 101 in the first frames F1 are positive voltages, and the voltages of the first electrodes 21 in the second liquid crystal cell 102 in the second frames F2 are negative voltages.

Optionally, referring to FIG. 7 to FIG. 11, an extension direction of the first electrodes 21 in the first liquid crystal cell 101 is the same as an extension direction of the first electrodes 21 in the second liquid crystal cell 102. The first electrodes 21 in the first liquid crystal cell 101 are set to be parallel to the first electrodes 21 in the second liquid crystal cell 102. The first electrodes 21 in the first liquid crystal cell 101 and the first electrodes 21 in the second liquid crystal cell 102 are all extend along a second direction Y. The first liquid crystal cell 101 and the second liquid crystal cell 102 form a liquid crystal grating.

It is to be noted that in addition to the use of two liquid crystal cells 100 to form a liquid crystal grating in the preceding embodiments, in other implementations, one liquid crystal cell 100 may also be used for forming a liquid crystal grating. When one liquid crystal cell 100 is used for forming a liquid crystal grating, the voltage variation trend of first electrodes 21 needs to be controlled so that the direction of the first electric field TE1 is the same as the alignment direction of the first alignment layer 31.

Figure 27:
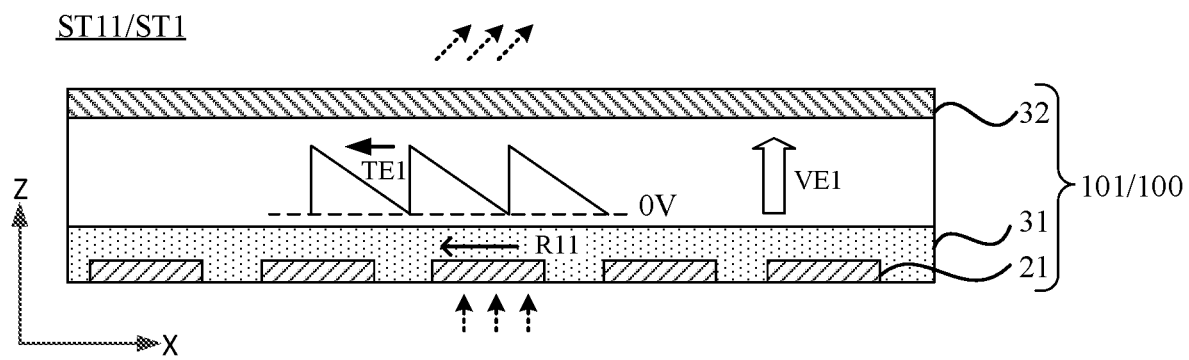
FIG. 27 is a diagram showing the operating process of another liquid crystal grating according to an embodiment of the present disclosure.
Figure 28:
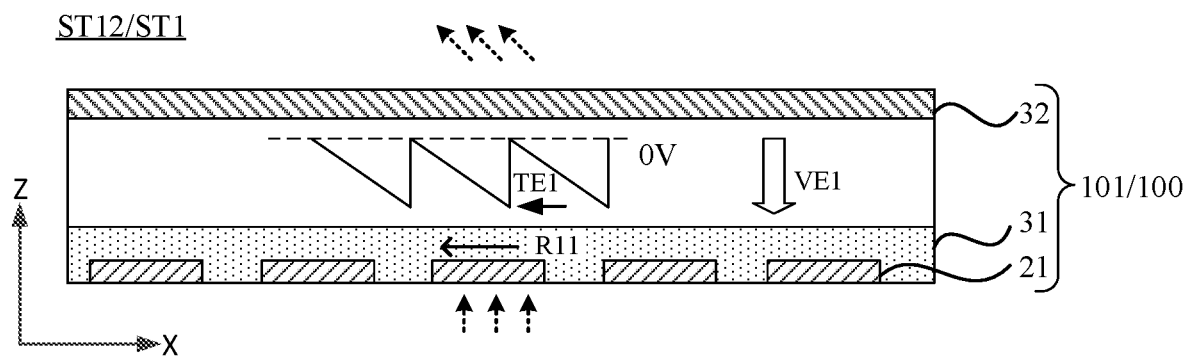
FIG. 28 is a diagram showing the operating process of another liquid crystal grating according to an embodiment of the present disclosure.

FIG. 27 is a diagram showing the operating process of another liquid crystal grating according to an embodiment of the present disclosure, and FIG. 28 is a diagram showing the operating process of another liquid crystal grating according to an embodiment of the present disclosure. Referring to FIG. 3, FIG. 27 and FIG. 28, two first states ST1 includes a first sub-state ST11 and a second sub-state ST12. That is, two first states ST1 are a first sub-state ST11 and a second sub-state ST12 respectively. The first sub-state ST11 represents the current state of a single liquid crystal cell 100 in the frame F (for example, in a first frame F1). In the first sub-state ST11, the liquid crystal cell 100 diffracts and deflects light towards the first side of the optical axis of the liquid crystal grating. The second sub-state ST12 represents the current state of a single liquid crystal cell 100 in the same frame F (for example, in a second frame F2). In the second sub-state ST12, the liquid crystal cell 100 diffracts and deflects light towards the second side of the optical axis of the liquid crystal grating. In the same liquid crystal cell 100, the polarity of voltages of first electrodes 21 in the first sub-state ST11 is opposite to the polarity of the voltages of the first electrodes 21 in the second sub-state ST12. In the same liquid crystal cell 100, the electric field direction of the first electric field TE1 in the first sub-state ST11 is the same as the electric field direction of the first electric field TE1 in the second sub-state ST12. In the first sub-state ST11 and the second sub-state ST12, the direction of the first electric field TE1 is the same as the alignment direction of the first alignment layer 31, so that liquid crystal molecules close to the first alignment layer 31 do not flip to an opposite direction, the adverse impact of the transverse electric field on the rotation of liquid crystal molecules is reduced, and the problem of antiphase domains is alleviated. In the embodiment of the present disclosure, in a single liquid crystal cell 100, light deflection in two directions is achieved through positive-negative voltage switching, and the direction of the first electric field TE1 is the same as the alignment direction of the first alignment layer 31 in two types of frames, so that liquid crystal molecules close to the first alignment layer 31 do not flip to an opposite direction, the adverse impact of the transverse electric field on the rotation of liquid crystal molecules is reduced, and the problem of antiphase domains is alleviated. The polarity of voltages of first electrodes 21 in the first sub-state ST11 is opposite to the polarity of the voltages of the first electrodes 21 in the second sub-state ST12. Therefore, when the same liquid crystal cell 100 operates in a manner of positive-negative frame transformation, the direction of a longitudinal electric field formed in the positive frames may be opposite to the direction of a longitudinal electric field formed in the negative frames, so that in the positive frames, the impurities move towards the first electrode 21, and in the negative frames, the impurities move towards the second electrode 22; or in the positive frames, the impurities move towards the second electrode 22, and in the negative frames, the impurities move towards the first electrode 21; in this manner, the impurities are prevented from accumulating on one side. It is to be noted that in the embodiment of the present disclosure, the liquid crystal grating includes only one liquid crystal cell 100, so that the thickness of the liquid crystal grating is reduced, light transmittance is improved, and costs of the liquid crystal grating are reduced.

Exemplarily, referring to FIG. 3 and FIG. 27, in the first sub-state ST11, voltages of first electrodes 21 are positive voltages. In the same first grating unit 401, the voltages of the first electrodes 21 gradually decrease along the first direction X. The liquid crystal cell 100 is configured to diffract and deflect light towards the first side of the optical axis of the liquid crystal grating. The first side of the optical axis of the liquid crystal grating is the right side of the optical axis of the liquid crystal grating. For the observer facing the direction of light propagation, the light is deflected into and enters the left eye of the observer.

Exemplarily, referring to FIG. 3 and FIG. 28, in the second sub-state ST12, the voltages of the first electrodes 21 are negative voltages. In the same first grating unit 401, the voltages of the first electrodes 21 gradually decrease along the first direction X. The liquid crystal cell 100 is configured to diffract and deflect light towards the second side of the optical axis of the liquid crystal grating. The second side of the optical axis of the liquid crystal grating is the left side of the optical axis of the liquid crystal grating. For the observer facing the direction of light propagation, the light is deflected into and enters the right eye of the observer.

Figure 29:
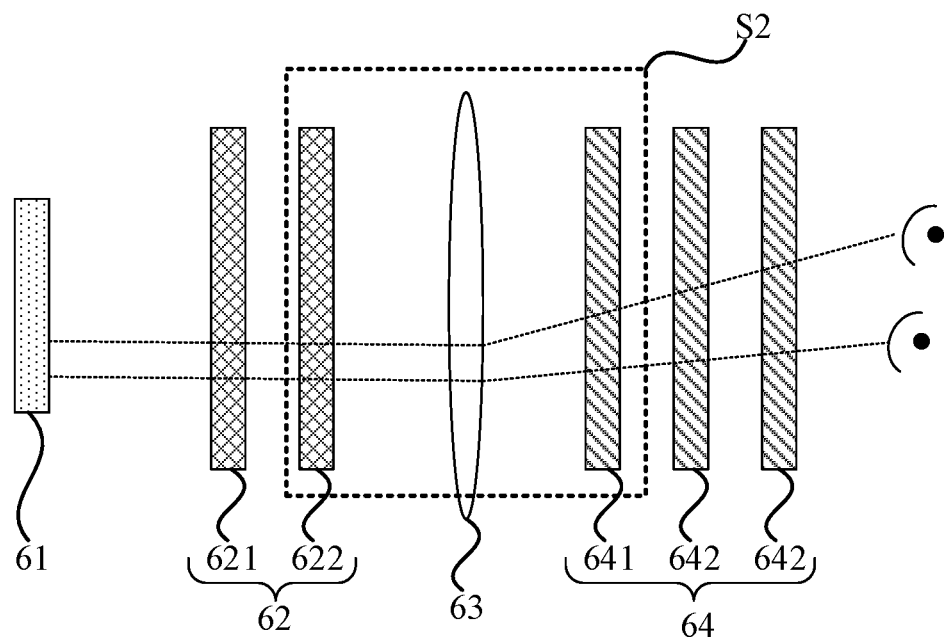
FIG. 29 is a diagram of a stereoscopic display device according to an embodiment of the present disclosure.

FIG. 29 is a diagram of a stereoscopic display device according to an embodiment of the present disclosure. Referring to FIG. 29, the stereoscopic display device includes a light source 61, a spatial light modulator 62 and a gating component 64 which are disposed sequentially. The gating component 64 includes at least one liquid crystal grating in the preceding embodiments.

Exemplarily, referring to FIG. 29, the light source 61 is used for emitting coherent backlight of three colors, that is, red light, green light and blue light, in a timing sequence. The spatial light modulator 62 includes a first spatial light modulator 621 for phase modulation and a second spatial light modulator 622 for amplitude modulation. The stereoscopic display device further includes a field lens 63, which is located between the spatial light modulator 62 and the grating component 64. The field lens 63 is at least used for improving the capability of edge light of light emitted by the spatial light modulator 62 of being incident into the grating component 64. The grating component 64 is used for forming left-eye images and right-eye images based on the incident light.

Exemplarily, referring to FIG. 29, the grating component 64 includes three liquid crystal gratings. The three liquid crystal gratings are a first liquid crystal grating 641, a second liquid crystal grating 642 and a third liquid crystal grating 643 respectively. Any two of first electrodes 21 of the first liquid crystal grating 641, first electrodes 21 of the second liquid crystal grating 642 and first electrodes 21 of the third liquid crystal grating 643 may have different extension directions. In other implementations, the grating component 64 may also include liquid crystal gratings of other numbers.

Figure 30:
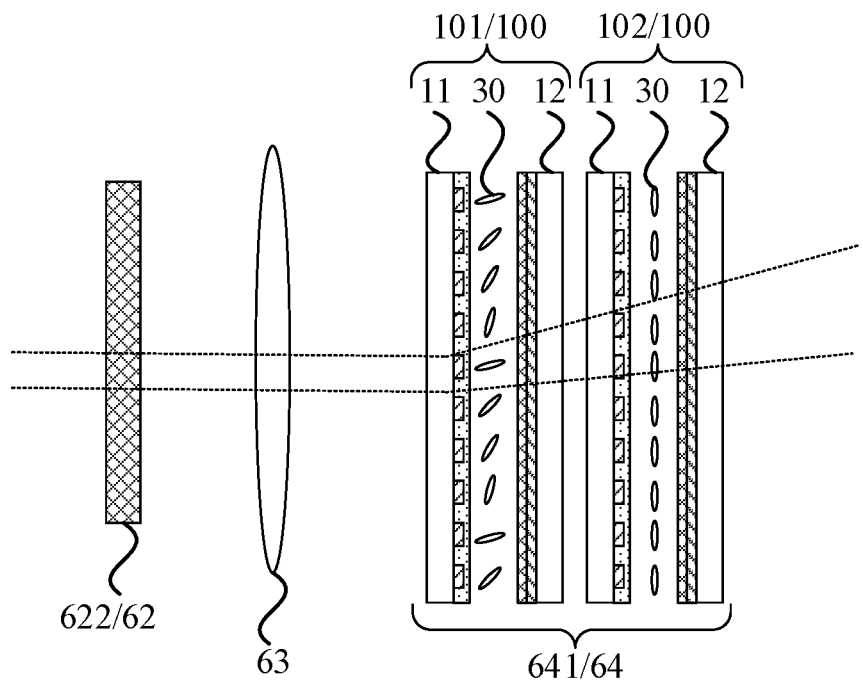
FIG. 30 is a diagram showing the structure of region S2 in FIG. 29.

FIG. 30 is a diagram showing the structure of region S2 in FIG. 29. Referring to FIG. 3, FIG. 29 and FIG. 30, the first substrate 11 is located between the second substrate 12 and the spatial light modulator 62 in the same liquid crystal cell 100. The first electrodes 21 are located between the second electrode 22 and the spatial light modulator 62 in the same liquid crystal cell 100. In other implementations, the position of the first electrodes 21 and the position of the second electrode 22 may also be swapped, that is, the second substrate 12 is located between the first substrate 11 and the spatial light modulator 62 in the same liquid crystal cell 100. The second electrode 22 is located between the first electrodes 21 and the spatial light modulator 62 in the same liquid crystal cell 100. After the position of the first electrodes 21 and the position of the second electrode 22 are swapped, the propagation path and the deflection direction of light are not affected compared with before position swapping.

It is to be noted that the preceding are only preferred embodiments of the present disclosure and technical principles used therein. It is to be understood by those skilled in the art that the present disclosure is not limited to the embodiments described herein. Those skilled in the art can make various apparent modifications, adaptations, combinations and substitutions without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A liquid crystal grating, comprising at least one liquid crystal cell, wherein a liquid crystal cell of the at least one liquid crystal cell comprises: a first substrate, first electrodes, a first alignment layer, a liquid crystal layer and a second substrate which are disposed sequentially;
   wherein in a first state, the liquid crystal cell comprises a plurality of first grating units which are arranged along a first direction, and a first grating unit of the plurality of first grating units comprises a plurality of first electrodes disposed along the first direction, and the plurality of first electrodes are disposed at intervals from each other; and
   along the first direction, a first electric field is formed between two closest first electrodes which are located in two adjacent first grating units of the plurality of first grating units, respectively, and in the liquid crystal cell, an alignment direction of the first alignment layer is the same as an electric field direction of the first electric field;
   wherein the liquid crystal cell further comprises a second electrode, and the second electrode is located between the second substrate and the liquid crystal layer; and
   wherein the liquid crystal cell further comprises a second alignment layer, and the second alignment layer is located between the second electrode and the liquid crystal layer; and
   in the liquid crystal cell, an alignment direction of the second alignment layer is opposite to the electric field direction of the first electric field.

2. The liquid crystal grating according to claim 1, wherein a same first grating unit of the plurality of grating units comprises a plurality of first electrode groups which are arranged along the first direction, a first electrode group of the plurality of first electrode groups comprises at least one first electrode and at least one second electrode; and
   in a same first electrode group of the plurality of first electrode groups, a first electrode at least partially overlaps a second electrode, and a voltage difference between the first electrode and the second electrode is a first voltage difference.

3. The liquid crystal grating according to claim 2, wherein first voltage differences have a same polarity.

4. The liquid crystal grating according to claim 2, wherein in the same first grating unit, along the first direction, first voltage differences gradually increase or gradually decrease.

5. The liquid crystal grating according to claim 1, wherein the plurality of first grating units share one second electrode.

6. A liquid crystal grating, comprising at least one liquid crystal cell,
   wherein a liquid crystal cell of the at least one liquid crystal cell comprises: a first substrate, first electrodes, a first alignment layer, a liquid crystal layer and a second substrate which are disposed sequentially;
   wherein in a first state, the liquid crystal cell comprises a plurality of first grating units which are arranged along a first direction, and a first grating unit of the plurality of first grating units comprises a plurality of first electrodes disposed along the first direction, and the plurality of first electrodes are disposed at intervals from each other; and
   along the first direction, a first electric field is formed between two closest first electrodes which are located in two adjacent first grating units of the plurality of first grating units, respectively, and in the liquid crystal cell, an alignment direction of the first alignment layer is the same as an electric field direction of the first electric field;
   wherein the liquid crystal cell further comprises a second electrode, and the second electrode is located between the second substrate and the liquid crystal layer; and
   wherein the liquid crystal cell further comprises a second alignment layer, and the second alignment layer is located between the second electrode and the liquid crystal layer;
   the first grating unit comprises a plurality of second electrodes which are disposed at intervals from each other along the first direction; and
   along the first direction, a second electric field is formed between two closest second electrodes which are located in the two adjacent first grating units, respectively, and in the liquid crystal cell, an alignment direction of the second alignment layer is the same as an electric field direction of the second electric field.

7. The liquid crystal grating according to claim 6, comprising two liquid crystal cells which are stacked, wherein the two liquid crystal cells are a first liquid crystal cell and a second liquid crystal cell respectively; and
   in the first state, the first liquid crystal cell comprises first grating units, and any two first electrodes in the second liquid crystal cell have a same voltage.

8. The liquid crystal grating according to claim 7, wherein in a second state, the second liquid crystal cell comprises at least one second grating unit, a second grating unit of the at least one second grating unit comprises a plurality of first electrodes which are disposed at intervals from each other along the first direction;
    a voltage variation trend of the plurality of first electrodes of the second grating unit in the second state is opposite to a voltage variation trend of first electrodes of the first grating units in the first state; and
    in the second state, a third electric field is formed between two closest first electrodes which are located in two adjacent second grating units of the at least one second grating unit, respectively, and in the second liquid crystal cell, the alignment direction of the first alignment layer is the same as an electric field direction of the third electric field.

9. The liquid crystal grating according to claim 6, comprising two liquid crystal cells which are stacked, wherein the two liquid crystal cells are a first liquid crystal cell and a second liquid crystal cell respectively;
    in the first state, the first liquid crystal cell comprises first grating units, the second liquid crystal cell comprises at least one third grating unit, and a third grating unit of the at least one third grating unit comprises a plurality of first electrodes which are disposed at intervals from each other along the first direction; and
    along the first direction, a fifth electric field is formed between two closest first electrodes which are located in two adjacent third grating units of the at least one third grating unit, respectively, and in the second liquid crystal cell, the alignment direction of the first alignment layer is the same as an electric field direction of the fifth electric field.

10. The liquid crystal grating according to claim 9, wherein the alignment direction of the first alignment layer in the first liquid crystal cell is different from the alignment direction of the first alignment layer in the second liquid crystal cell;
    the electric field direction of the first electric field is opposite to the electric field direction of the fifth electric field; and
    in the first state, voltages of first electrodes in the first liquid crystal cell and voltages of the plurality of first electrodes in the second liquid crystal cell have opposite polarities.

11. The liquid crystal grating according to claim 6, comprising two liquid crystal cells which are stacked, wherein
    an operating time of the liquid crystal grating comprises a plurality of frames, and in a same frame of the plurality of frames, one of the two liquid crystal cells is configured for light diffraction and deflection, and the other one of the two liquid crystal cells is not configured for or assists in light deflection.

12. The liquid crystal grating according to claim 11, wherein the two liquid crystal cells are a first liquid crystal cell and a second liquid crystal cell respectively;
    the plurality of frames comprise first frames and second frames, and the second frames are placed after the first frames;
    in the first frames, the first liquid crystal cell operates in the first state and is configured mainly to diffract and deflect light towards a first side of an optical axis of the liquid crystal grating; and
    in the second frames, the second liquid crystal cell operates in a second state and is configured mainly to diffract and deflect light towards a second side of the optical axis of the liquid crystal grating, wherein the first side and the second side are located at two opposite sides of the optical axis of the liquid crystal grating.

13. The liquid crystal grating according to claim 12, wherein in the first frames, voltages of first electrodes in a same first grating unit of the first liquid crystal cell gradually decrease along the first direction; and
    in the second state, the second liquid crystal cell comprises at least one second grating unit, a second grating unit of the at least one second grating unit comprises a plurality of first electrodes which are disposed at intervals from each other along the first direction;
    in the second frames, voltages of first electrodes in a same second grating unit of the at least one second grating unit of the second liquid crystal cell gradually increase along the first direction.

14. The liquid crystal grating according to claim 13, wherein voltages of first electrodes in the first liquid crystal cell in the first frames have a same polarity as voltages of first electrodes in the second liquid crystal cell in the second frames.

15. The liquid crystal grating according to claim 6, comprising two liquid crystal cells which are stacked, wherein the two liquid crystal cells are a first liquid crystal cell and a second liquid crystal cell respectively; and
    an extension direction of first electrodes in the first liquid crystal cell is the same as an extension direction of first electrodes in the second liquid crystal cell.

16. The liquid crystal grating according to claim 6, wherein two first states comprise a first sub-state and a second sub-state;
    in a same liquid crystal cell of the at least one liquid crystal cell, a polarity of voltages of first electrodes in the first sub-state is opposite to a polarity of voltages of first electrodes in the second sub-state; and
    in a same liquid crystal cell of the at least one liquid crystal cell, the electric field direction of the first electric field in the first sub-state is the same as the electric field direction of the first electric field in the second sub-state.

17. A stereoscopic display device, comprising a light source, a spatial light modulator and a gating component which are disposed sequentially, wherein
    the gating component comprises at least one liquid crystal grating according to claim 6.

18. The stereoscopic display device according to claim 17, wherein a first substrate is located between a second substrate and the spatial light modulator in a same liquid crystal cell; or
    a second substrate is located between a first substrate and the spatial light modulator in a same liquid crystal cell.

19. The liquid crystal grating according to claim 6, wherein
    a same first grating unit of the plurality of grating units comprises a plurality of first electrode groups which are arranged along the first direction, a first electrode group of the plurality of first electrode groups comprises at least one first electrode and at least one second electrode;
    in a same first electrode group of the plurality of first electrode groups, a first electrode at least partially overlaps a second electrode, and a voltage difference between the first electrode and the second electrode is a first voltage difference.

20. The liquid crystal grating according to claim 6, wherein first voltage differences have a same polarity.

21. The liquid crystal grating according to claim 6, wherein in the same first grating unit, along the first direction, first voltage differences gradually increase or gradually decrease.

22. The liquid crystal grating according to claim 6, wherein the plurality of first grating units share one second electrode.

23. A liquid crystal grating, comprising at least one liquid crystal cell,
wherein a liquid crystal cell of the at least one liquid crystal cell comprises: a first substrate, first electrodes, a first alignment layer, a liquid crystal layer and a second substrate which are disposed sequentially;
wherein in a first state, the liquid crystal cell comprises a plurality of first grating units which are arranged along a first direction, and a first grating unit of the plurality of first grating units comprises a plurality of first electrodes disposed along the first direction, and the plurality of first electrodes are disposed at intervals from each other; and
along the first direction, a first electric field is formed between two closest first electrodes which are located in two adjacent first grating units of the plurality of first grating units, respectively, and in the liquid crystal cell, an alignment direction of the first alignment layer is the same as an electric field direction of the first electric field; and
wherein the liquid crystal grating further comprises two liquid crystal cells which are stacked, wherein the two liquid crystal cells are a first liquid crystal cell and a second liquid crystal cell respectively;
in the first state, the first liquid crystal cell comprises first grating units, the second liquid crystal cell comprises at least one third grating unit, and a third grating unit of the at least one third grating unit comprises a plurality of first electrodes which are disposed at intervals from each other along the first direction; and
along the first direction, a fourth electric field is formed between two adjacent first electrodes which are located in a same third grating unit of the at least one third grating unit, and an electric field direction of the fourth electric field is opposite to the electric field direction of the first electric field.

24. The liquid crystal grating according to claim 23, wherein along the first direction, a fifth electric field is formed between two closest first electrodes which are located in two adjacent third grating units of the at least one third grating unit, respectively, and in the second liquid crystal cell, the alignment direction of the first alignment layer is opposite to an electric field direction of the fifth electric field; and
an absolute value of the first electric field is smaller than an absolute value of the first electric field.

25. The liquid crystal grating according to claim 24, wherein each of the two liquid crystal cells further comprises a second electrode, and the second electrode is located between the second substrate and the liquid crystal layer;
a same third grating unit of the at least one third grating unit comprises a plurality of second electrode groups which are arranged along the first direction, a second electrode group of the plurality of second electrode groups comprises at least one first electrode and at least one second electrode;
in a same second electrode group of the plurality of second electrode groups, a first electrode at least partially overlaps a second electrode, and a voltage difference between the first electrode and the second electrode is a second voltage difference and forms a sixth electric field; and
an absolute value of the fifth electric field is smaller than an absolute value of a maximum value of the sixth electric field.

26. The liquid crystal grating according to claim 25, wherein the liquid crystal layer comprises liquid crystal molecules, and the absolute value of the maximum value of the sixth electric field is smaller than a threshold electric field value for driving the liquid crystal molecules to rotate.

27. The liquid crystal grating according to claim 24, wherein a number of first electrodes in a first grating unit of the first grating units is the same as a number of first electrodes in a third grating unit of the at least one third grating unit.

28. The liquid crystal grating according to claim 23, wherein a number the first grating units in the first liquid crystal cell is larger than a number of the at least one third grating unit in the second liquid crystal cell.

* * * * *